United States Patent [19]

Umehara et al.

[11] Patent Number: 5,721,928
[45] Date of Patent: Feb. 24, 1998

[54] METHOD FOR PARTITIONING COMPUTATION

[75] Inventors: Kiyomi Umehara, Kawasaki; Makoto Satoh, Sagamihara; Fujio Yamamoto, Higashiyamato, all of Japan

[73] Assignee: Hitachi, Ltd., Tokyo, Japan

[21] Appl. No.: 650,008

[22] Filed: May 16, 1996

Related U.S. Application Data

[63] Continuation of Ser. No. 281,838, Jul. 28, 1994, abandoned.

[30] Foreign Application Priority Data

Aug. 3, 1993 [JP] Japan ................... 5-210956

[51] Int. Cl.$^6$ ........................... G06F 9/45
[52] U.S. Cl. ........................... 395/706
[58] Field of Search ........................... 395/706

[56] References Cited

U.S. PATENT DOCUMENTS

| | | | |
|---|---|---|---|
| 5,088,034 | 2/1992 | Ihara et al. | 395/706 |
| 5,093,916 | 3/1992 | Karp et al. | 395/685 |
| 5,230,053 | 7/1993 | Zaiki | 395/706 |
| 5,293,631 | 3/1994 | Rau et al. | 395/707 |
| 5,317,743 | 5/1994 | Imai et al. | 395/706 |
| 5,414,849 | 5/1995 | Yamamoto | 395/706 |
| 5,437,034 | 7/1995 | Tanaka et al. | 395/706 |
| 5,475,842 | 12/1995 | Gilbert et al. | 395/706 |
| 5,551,039 | 8/1996 | Weinberg et al. | 395/706 |

OTHER PUBLICATIONS

Choudhary et al., Compiling Fortuar 77D and 90D for MIMD Distributed –Memory Machines, 1992, IEEE, pp. 4–11.

Chase et al., Data Remapping for Distributed–Memory Multicomputers, 1992, IEEE, pp. 137–144.

Gupta et al., Demonstration of Automatic Data Partitioning Techniques . . . , 1992, IEEE, pp. 179–193.

Ramanujam et al., Compile–Time Techniques for Data Distribution in Distributed Memory Machines, 1991, IEEE, pp. 472–482.

*Primary Examiner*—Parshotam S. Lall
*Assistant Examiner*—Kenneth R. Coulter
*Attorney, Agent, or Firm*—Fay Sharpe Beall Fagan Minnich & Mckee

[57] ABSTRACT

A computation partitioning method is arranged to automatically convert a sequential source program for a single processor into a partitioned computation for a distributed memory machines containing plural processors. The method is executed to analyze a syntax of a source program described in a high-level language containing at least one loop having plural assignment statements, each assignment having an array, distribute the array element in the source program and at least one loop and allocate the partitioned parts of the array element to the processors. For each processor, then, the method is further executed to derive a loop iteration set corresponding to an array element distributed to the processor for plural assignment statements in at least one loop and generate a new array having the sum set of the derived loop iteration set as its array elements. By using the new generated array index as the loop iteration set of the assignment statements in at least one loop, the partitioned computation to be executed by each processor is generated.

9 Claims, 27 Drawing Sheets

```
              DIMENSION A(8,3)
         ┌─   DO 202  I=1,4
202 ─────┤         DO 202  J=2,4
         │              ...A(I+J,J-1)...
         └─   202 CONTINUE
```

```
401        DIMENSION A(100,100)
           DO 400  I=2,99
               DO 400  J=2,100
                   A(I-1,J)=·········
       400 CONTINUE
```

402

```
4114       DIMENSION A(25,100)
           IF (PE4) THEN
               DO 410  I=2,24
                   DO 410  J=2,100
                       A(I-1,J)=·········
       410         CONTINUE
           ELSE
               DO 420  I=2,26
                   DO 420  J=2,100
                       A(I-1,J)=·········
       420         CONTINUE
           ENDIF
```

501

```
      DIMENSION A(1,16),B(1,16)
      DO 500 I=1,16
          A(I)=0
          B(I)=1
500   CONTINUE
```

5114

```
      DIMENSION A(1,4),B(1,4)
      DO 510 I=1,4       ⎤
          A(I)=0          ⎬ — 510
510   CONTINUE           ⎦
      DO 520 I=1,16      ⎤
          B(I)=1          ⎬ — 520
520   CONTINUE           ⎦
```

DIMENSION A(1,16)

| I | 1 | 4 5 | 8 9 | 12 13 | 16 |
|---|---|-----|-----|-------|----|
| A(I) | PE1 | PE2 | PE3 | PE4 | |

DIMENSION A(1,4)

DO 600 I=1,16

IF ((I.GE.1) .AND. (I.LE.4)) THEN A(I)=A(I)+1

IF ((I.GE.13) .AND. (I.LE.16)) THEN A(17-I)=A(17-I)*2

600 CONTINUE

FIG.7A
701
DIMENSION A(0,17),B(0,17)
```
     DO 700 I=1,16
704 ── A(I)=B(I-1)+1      ⎤
705 ── B(I)=A(I-1)*2      ⎦ ─700
     700  CONTINUE
```
FIG.7B
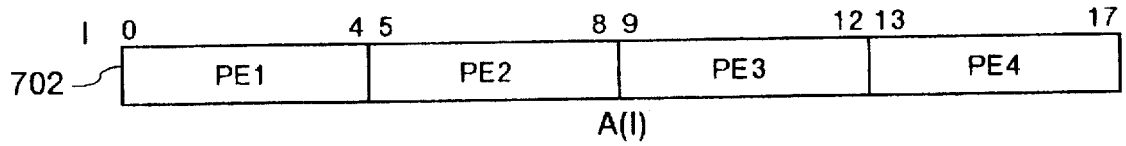
A(I)
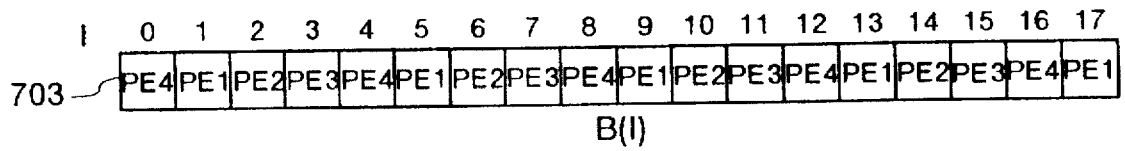
B(I)
FIG.7C
7114
DIMENSION A(0,5),B(0,5)
DO 700 I=1,4
A(I)=B(I-1)+1
B(I)=A(I-1)*2
700 CONTINUE

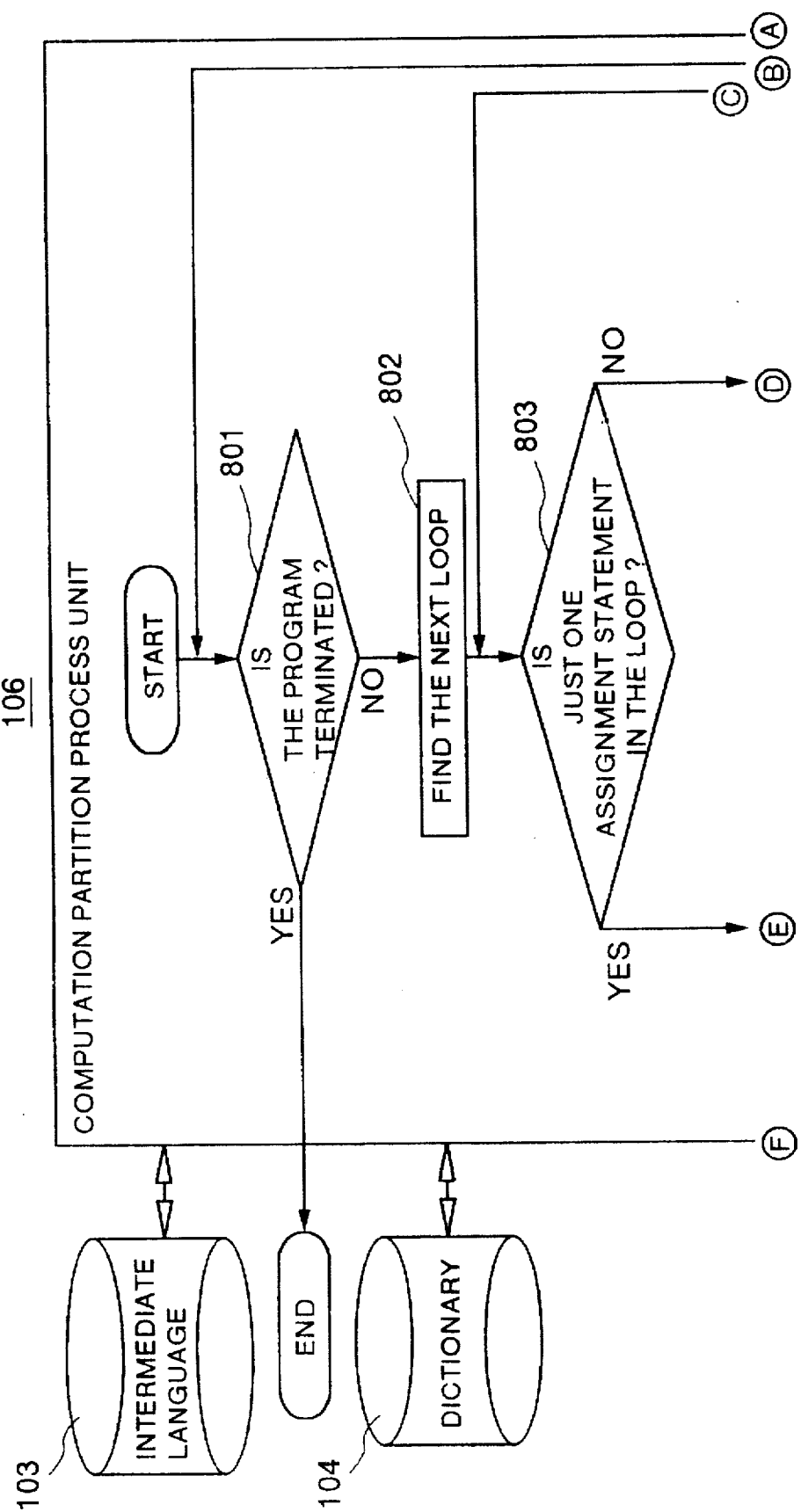

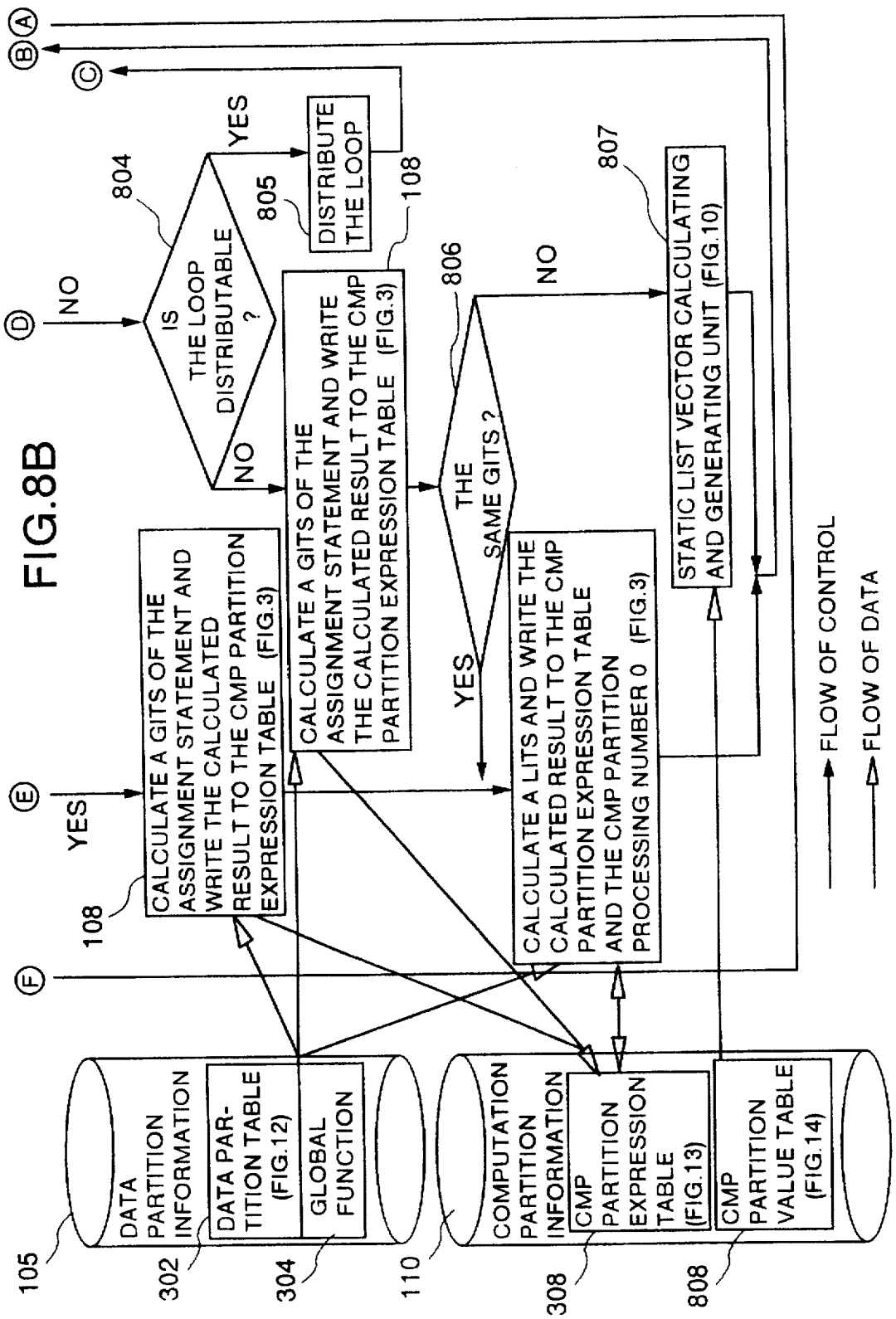

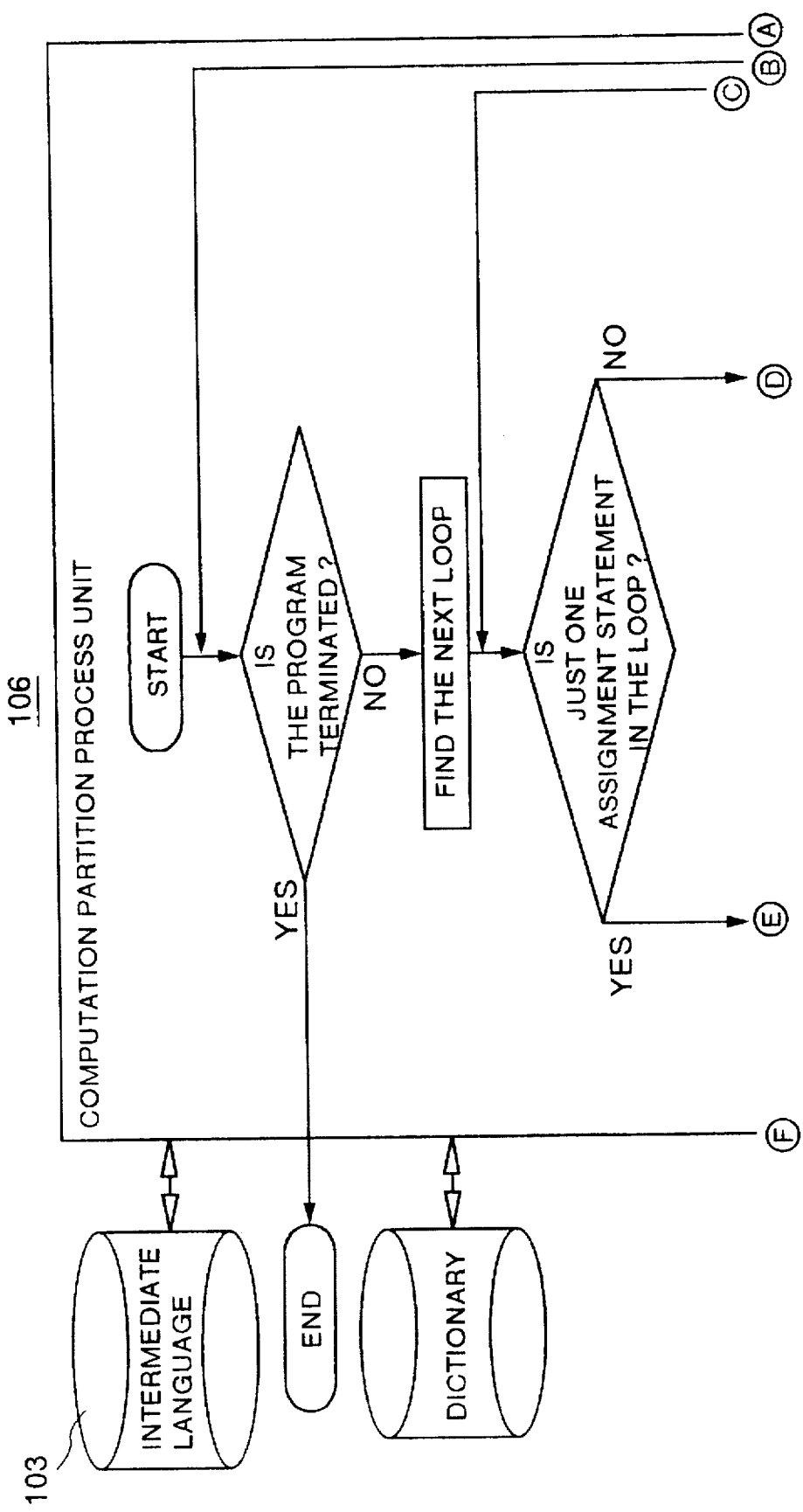

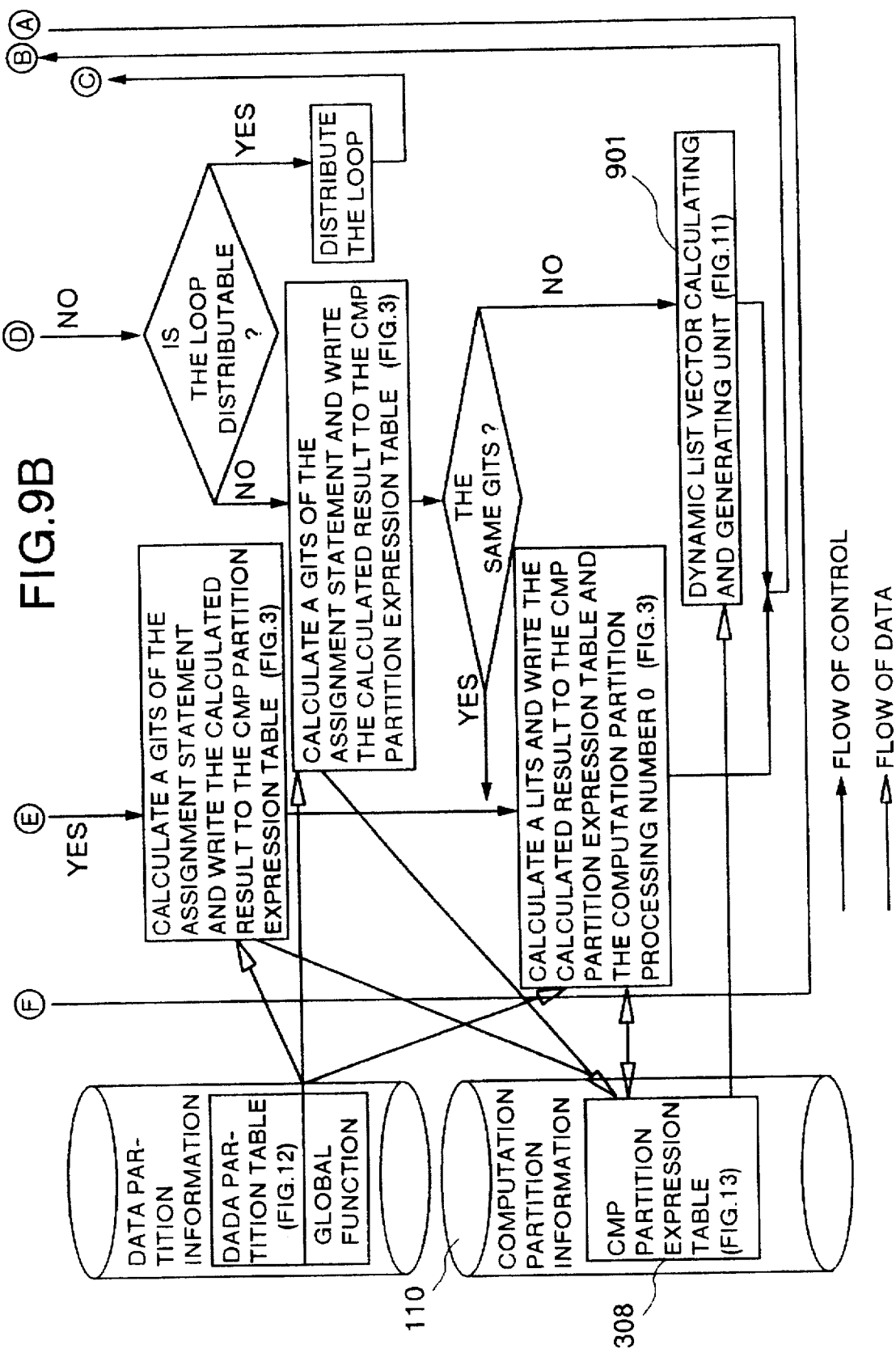

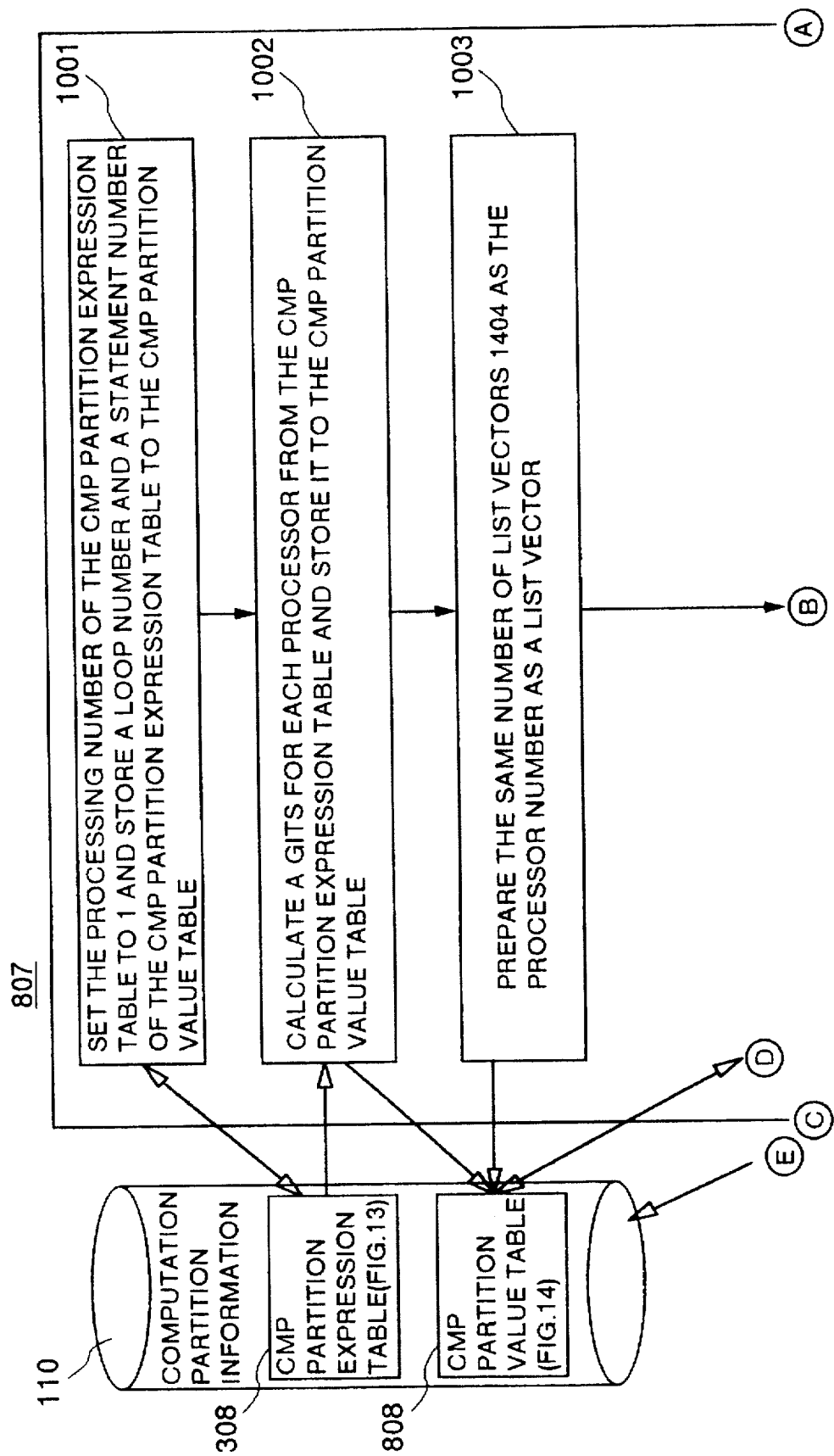

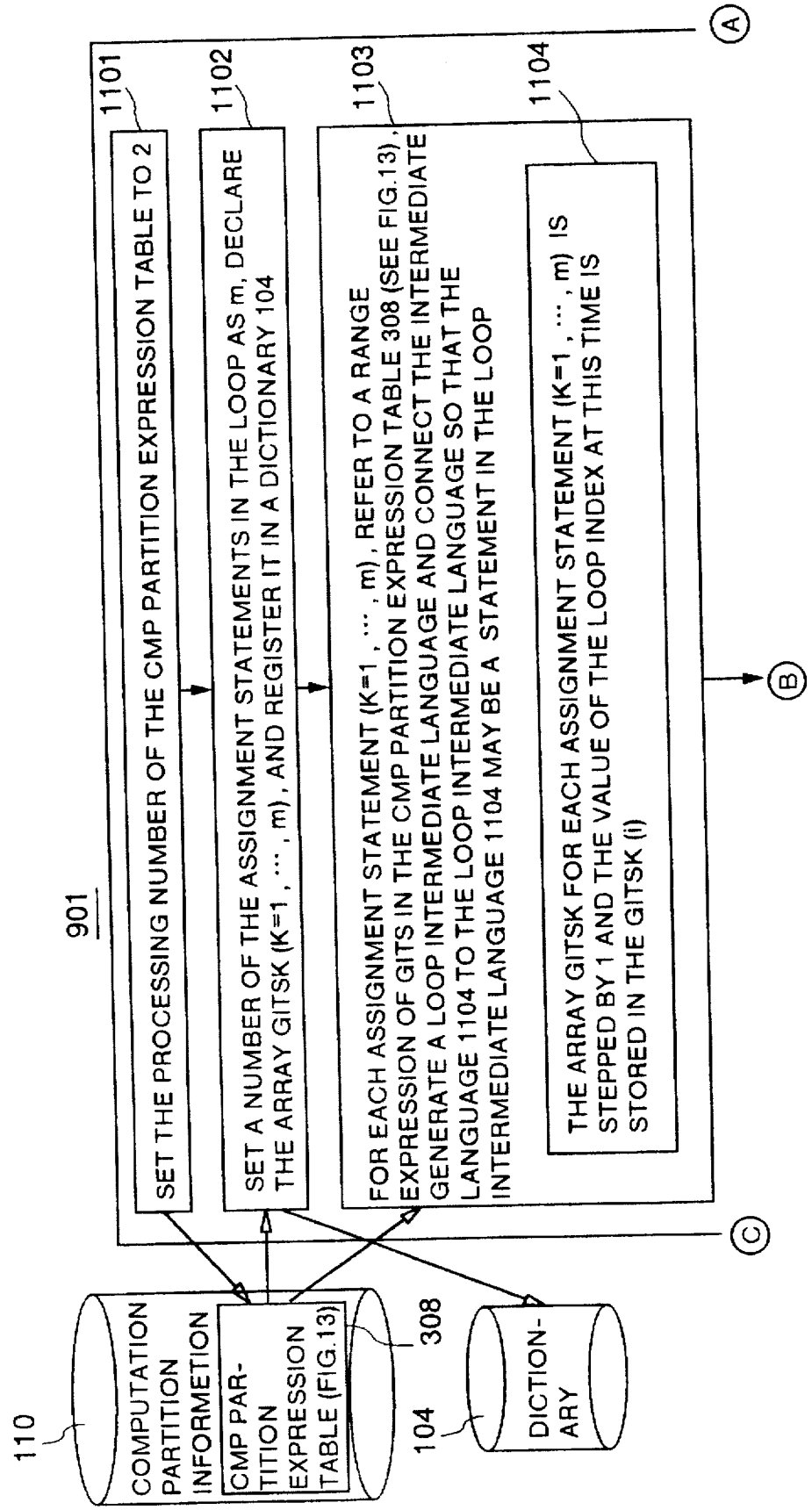

FIG.20

```
            INTEGER J,K

DATA J,K/1,1/

2001 ——— p=WHOAMIO

DO 700 I=1,np

2002 ——— IF(Lp(I) .EQ. GITSAp(J)) THEN

2004 ——— A(Lp(I))=B(Lp(I)-1)

J=J+1

ENDIF

2003 ——— IF(Lp(I) .EQ. GITSBp(K)) THEN

2005 ——— B(Lp(I))=A(Lp(I)-1)*2

K=K+1

ENDIF

```
INTEGER GITSA1(4),GITSA2(4),GITSA3(4),GITSA4(4)
INTEGER GITSB1(4),GITSB2(4),GITSB3(4),GITSB4(4)
DATA GITSA1/1,2,3,4/
DATA GITSA2/5,6,7,8/
DATA GITSA3/9,10,11,12/
DATA GITSA4/13,14,15,16/
DATA GITSB1/1,5,9,13/
DATA GITSB2/2,6,10,14/
DATA GITSB3/3,7,11,15/
DATA GITSB4/4,8,12,16/
PARAMETER (n1=7,n2=7,n3=7,n4=7)
INTEGER L1(n1),L2(n2),L3(n3),L4(n4)
DATA L1/1,2,3,4,5,9,13/
DATA L2/2,5,6,7,8,10,14/
DATA L3/3,7,9,10,11,12,15/
DATA L4/4,8,12,13,14,15,16/
INTEGER J,K
DATA J,K/1,1/
p=WHOAMI
DO 700 I=1,np
   IF(Lp(I) .EQ. GITSAp(J)) THEN
      RECEIVE(TMP,fB(Lp(I)-1),Lp(I))
      A(gA(Lp(I)))=TMP+1
      SEND(gA(Lp(I))),fB(Lp(I)+1),Lp(I)+1)
      J=J+1
   IF(Lp(I) .EQ. GITSBp(K)) THEN
      RECEIVE(TMP,fA(Lp(I)-1),Lp(I))
      B(gB(Lp(I)))=TMP*2
      SEND(gB(Lp(I))),fA(Lp(I)+1),Lp(I)+1)
      K=K+1
   ENDIF
700 CONTINUE
```

FIG.22

```
2201 ——— INTEGER GITSA(4),GITSB(4)
          INTEGER J,K
          DATA J,K/0,0/
2001 ——— p=WHOAMIO
            ┌  DO 100 I=4p-3,4p
            │     J=J+1
2202 ———   │     GITSA(J)=I
            └ 100 CONTINUE
            ┌  DO 200 I=p,12+p,4
            │     K=K+1
2203 ———   │     GITSB(K)=I
            └ 200 CONTINUE
2204 ——— CALL MERGE(GITSA(1:J),GITSB(1:K),L(1:16),n)
2205 ——— ┌ J=1
          └ K=1
          DO 700 I=1,n
             IF(L(I).EQ. GITSA(J)) THEN
                A(L(I))=B(L(I)-1)+1
                J=J+1
             IF(L(I).EQ. GITSB(K)) THEN
                B(L(I))=A(L(I)-1)*2
                K=K+1
             ENDIF
          700 CONTINUE
```

```
      INTEGER GITSA(4),GITSB(4),L(16)
      INTEGER J,K
      DATA J,K/0,0/
      p=WHOAMIO
      DO 100 I=4p-3,4p
            J=J+1
            GITSA(J)=I
100   CONTINUE
      DO 200 I=p,12+p,4
            K=K+1
            GITSB(K)=I
200   CONTINUE
      CALL MERGE(GITSA(1:J),GITSB(1:K),L(1:16),n)
      J=1
      K=1
      DO 700 I=1,n
      IF(L(I).EQ. GITSA(J)) THEN
            RECEIVE(TMP,fB(L(I)-1),L(I))
            A(gA(L(I)))=TMP+1
            SEND(A(gA(L(I))),fB(L(I)+1),L(I)+1)
            J=J+1
      IF(L(I).EQ. GITSB(K)) THEN
            RECEIVE(TMP,fA(L(I)-1),L(I))
            B(gB(L(I)))=TMP*2
            SEND(B(gB(L(I))),fA(L(I)+1),L(I)+1)
            K=K+1
      ENDIF
700   CONTINUE
```

INTEGER GITSA1(4),GITSA2(4),GITSA3(4),GITSA4(4)

INTEGER GITSA1'(4),GITSA2'(4),GITSA3'(4),GITSA4'(4)

DATA GITSA1/1,2,3,4/

DATA GITSA2/5,6,7,8/

DATA GITSA3/9,10,11,12/

DATA GITSA4/13,14,15,16/

DATA GITSA1'/13,14,15,16/

DATA GITSA2'/9,10,11,12/

DATA GITSA3'/5,6,7,8/

DATA GITSA4'/1,2,3,4/

PARAMETER (n1=8,n2=8,n3=8,n4=8)

INTEGER L1(n1),L2(n2),L3(n3),L4(n4)

DATA L1/1,2,3,4,13,14,15,16/

DATA L2/5,6,7,8,9,10,11,12/

DATA L3/5,6,7,8,9,10,11,12/

DATA L4/1,2,3,4,13,14,15,16/

INTEGER J,K

DATA J,K/1,1/ p=WHOAMI

DO 600 I=1,np

IF(Lp(I) .EQ. GITSAp(J)) THEN

A(gA(Lp(I)))=A(gA(Lp(I)))+1

J=J+1

ENDIF

IF(Lp(I) .EQ. GITSAp'(K)) THEN

A(gA(17-Lp(I)))=A(gA(17-Lp(I)))*2

K=K+1

ENDIF

600  CONTINUE

METHOD FOR PARTITIONING COMPUTATION

This is a continuation of application Ser. No. 08/281,838, filed Jul. 28, 1994, now abandoned.

BACKGROUND OF THE INVENTION

The present invention relates to a method for converting a program for a single processor into a program oriented for a parallel computer, and in particular to the method for partitioning computation which method receives as an input a sequential source program with data decomposition directive (direction about a way of partioning and distributing data to each processor of a distributed memory machines) and automatically creating a source program or an object program containing a call of a parallel library, for the distributed memory machines by using a computer.

To increase a computing speed, a parallel computing system has been designed in which processors are provided so that they may be operated concurrently. In the parallel computing system, each processor normally provides a local memory.

On the other hand, the conventional source program coded for a single processor is created on the assumption that just one single memory is provided. Hence, if the source program coded for the single processor is operated in a parallel computing system, it is necessary to convert the source program into a program arranged so that the data (such as an array) in the source program is partitioned in plural data groups and each of the data groups is distributed to the local memory of each processor in the parallel computing system.

As a method for partitioning computation to each processor, the source program is converting into a program for the parallel system on the principle that a variable is distributed to each processor and "an assignment statement is executed by a processor to which a variable of a left side of an assignment statement is allocated". Hereafter, the conversion of the sequential program oriented for a single processor into a program for the parallel computing system is called as partitioning computation.

Later, the conventional method for partitioning computation will be described. Herein, the description will be expanded on a DO loop.

In the original sequential source program, if the assignment statement is iteratively computed in the loop, the range in which the loop is iterated is partitioned into plural parts so that those partitioned parts may be respectively allocated to the processors in a manner to establish the above-mentioned principle.

Such a method for partitioning a program is discussed in Vasanth Balasundaram, Geoffrey Fox, Ken Kennedy and Ulrich Kremer: "An Interactive Environment for Data Partitioning and Distribution", Fifth Distributed Memory Computing Conference, Charleston, S.C., Apr. 9–12, 1990, pp. 1160 to 1170.

The system of executing the program discussed in this paper is SPMD (Single Program Multiple Data) based on the data owner computes rule. The term "SPMD" means that each processor has the same program. The term "data owner computes rule" means that a processor operates to define an array element only if the array element is allocated to the processor.

As such, in the method for partitioning computation, based on the way of data partitioning and distribution, computation is partitioned by a computer in a manner that the assignment statement is executed by each processor to which each array element in the left side of each assignment statement is allocated. For this purpose, the process of partitioning computation is executed to enter an original sequential source program and the data partition information into the computer and to output the converted source program and partitioning computation information.

Herein, the data partition information means the items (1) to (4) indicated below.

(1) Data Partition Function (mapping an index of an array element into a processor number to which data is allocated) indicating a way of partitioning data and a way of distribution data to each processor (2) Localizing Function for converting an index of each array element from a global index of an original sequential program into a local index of each processor (3) A group of functions composed of global functions for converting a local index into a global index, each global function corresponding to a reverse function to the localizing function (4) Data partition Table for storing a global representation and a local representation of an index of an array element for each processor, those representations being obtained by applying the above group of functions.

The computation partition information means the following items (i) and (ii) indicated below.

(i) Computation Partition Expression Table arranged to represent a range covering all the possible loop index values by means of an expression using processor numbers, which is used to indicate a loop iteration range of the original loop iteration set each processor should share to each assignment statement (ii) Computation Partition Value Table represented by a concrete value of a loop index to be actually referenced in each of the processors Hereafter, the method for partitioning computation by using the conventional method will be discussed in detail.

At first, a subscript function and a local iteration set (abbreviated as LITS) will be described below.

FIG. 2 shows an example of a program for describing the subscript function. In this figure, numerals 201 and 202 denote loops. In a multiple loop 201, A(S1, S2, . . . , Sm) is a reference (definition or use) of an array A. Each Sk is a subscript expression represented by an invariable expression in a loop containing loop index variables I1, I2, . . . , In and the reference.

The subscript function f to the array A (S1, S2, . . . , Sm) is a function for defining a value of each dimensional subscript expression S1, S2, . . . , Sm to the combination of loop index variables I1, I2, . . . , In. That is, in this example, the following expression is established.

$$f(I1, I2, \ldots, In) = (S1, S2, \ldots, Sm)$$

The reverse function inv_f (D1, D2, . . . , Dm)=(I1, I2, . . . , In) of the subscript function f is a function for defining each of the loop index variables I1, I2, . . . , In containing the array reference to the combination D1, D2, . . . , Dm of the array subscripts. That is, the subscript reverse function inv_f of the subscript function f is obtained by solving the simultaneous equations: S1=D1, S2=D2, . . . , Sm=DM of the array subscripts D1, D2, . . . , Dm with respect to the index variables I1, I2, . . . , In.

As an example, in a loop 202, the subscript function f for the array reference A (I+J, J−1) is f(I, j)=(I+J, J−1). The reverse subscript function inv_f (C, D) is derived as inv_f (C, D)=(C−(D+1), D+1) by solving two simultaneous equations of I+J=C and J−1=D with respect to I and J. That is, I=C−(D+1) and J=D+1 are obtained about the corresponding loop indexes to the array element subscript (C, D).

By using this subscript reverse function, A (5, 2) is referenced when I=5−(2+1)=2 and J=2+1=3. A (3, 3) is located out of an iteration set because I=3−(3+1)=−1 and J=3+1=4. Hence, it is understood that A (3, 3) is not referenced in the loop 202.

LITS means a representation of a loop iteration set to be shared by each processor in each assignment statement as a set for covering all the possible loop indexes of the processor.

FIG. 3 shows a procedure for obtaining the LITS. The process 108 for obtaining the LITS is executed to input a distribution data and an intermediate language 103 and output a computation partition information 110.

The procedure for obtaining the LITS will be described. At first, in a process 301 for computing a local index set (abbreviated as LIXS) of an array, the LIXS for each processor is obtained by referencing the data partition table 302 (see FIG. 12) of the data partition information 105.

The term LIXS means a set of index values of array elements allocated to each processor if the original data (array element) is allocated to each processor. This index value is a local value in each processor. The LIXS in the processor p for the array A is represented by LIXS_A(p).

Next, in the process 303 in which the LIXS is re-represented by the global index, GIXS_A(p), that is, a representation of LIXS_A(p) as a global index is obtained by means of a global function 304 of the data partition information 105. By this, from the LIXS_A(p) which corresponds to a local index value of each processor, it is possible to obtain the set GIXS_A(p) of the global index represented by the index value of the original program.

Next, in the process 305 in which the reverse function to the subscript function is calculated, the reverse function inv_f of the subscript function is calculated about the array A (S1, S2, ... , Sm) in the left side of the assignment statement.

In the process 306 for calculating a virtual loop iteration set for each processor, about each processor p, by applying the reverse function inv_f of the subscript function to LIXS_A(p), it is possible to obtain the virtual local iteration set VLITS_A(p) of the local loop in the processor p. Likewise, by applying the subscript reverse function inv_f to GIXS_A(p), it is possible to the virtual global iteration set VGITS_A(p) of the global loop.

Herein, VLITS_A(p) or VGITS_A(p) denotes an iteration set obtained on the LIXS_A(p) without considering the original loop iteration set. Hence, it may be located out of the original loop iteration set, which is the cause of putting an adjective "virtual" to it.

At last, in the process 307, the LITS is obtained from the virtual loop iteration set. This process 307 is concretely executed according to the following procedure.

At first, a set of intersections between the VGITS_A(p) and each section of a loop index is calculated. The calculated result is set as GITS_A(p). GITS_A(p) represents a GITS (Global Iteration Set) in the processor p for an array of an assignment statement to be noticed. The GITS is a representation of each assignment statement of a loop iteration set to be shared by each processor as a set for covering all the possible global loop indexes to be taken by the processor in the original program.

The virtual local iteration set VLITS_A(p) directly corresponds to VGITS_A(p). By reflecting a difference between the VGITS_A(p) and the GITS_A(p) on the VLITS_A(0), it is possible to obtain the local iteration set in the processor p for the array A. And, the obtained LITS_A(p) and GITS_A(p) are stored in a computation partition expression table 308 (see FIG. 13) of the computation partition information 110.

FIGS. 4A to 4C show an example of obtaining the LITS and partitioning computation. In FIG. 4A, numeral 401 denotes an original sequential source program. In FIG. 4B, numeral 402 denotes an array data partition attribute. In FIG. 4C, numeral 4114 denotes a node program of each processing element (abbreviated as a PE) after the computation partitioned.

With reference to FIGS. 3 and 4A to 4C, the procedure for partitioning computation 401 will be described. The array A in this program 401 is distributed to four PEs according to the data partition attribute 402.

At first, in the process 301, the LIXS of each process about an array A is obtained according to the data partition attribute. Herein, the following relation is established.

$$LIXS\_A(p)=([1:25,\ 1:100]),\ (p=0,1,2,3)$$

The plural values in brackets [ ] ranged from the left to the right correspond to the indexes from the outer to the inner, respectively. That is, the section of "1:25" corresponds to a loop of an outer index variable I. The section of "1:100" corresponds to a loop of an inner index variable J.

In the process 303, the GIXS_A(p) corresponding to the LIXS_A(p) is obtained. Herein, the GIXS_A(p) may have the following relations, for example.

$$GIXS\_A(1)=([1:25],[1:100])$$

$$GIXS\_A(2)=([26:50],[1:100])$$

$$GIXS\_A(3)=([51:75],[1:100])$$

$$GIXS\_A(4)=([76:100],[1:100])$$

In the process 305, the reverse function to the subscript function is calculated. The subscript function f against the left-side array reference A (I−1, j) of the assignment statement is f(I−1, j). Hence, the reverse function of the subscription function f is inv_f (C, D)=(C+1, D).

In the process 306, by applying this subscript reverse function inv_f to the LIXS_A(p), it is possible to obtain the virtual local iteration set VLITS_A(p) (set represented by the local indexes in the original loop iteration) in the process p for A (I−1, j). The range is as follows.

$$\begin{aligned}VLITS\_A(p) &= inv\_f\,(LIXS\_A(p))\\ &= inv\_f\,([1:25],[1:100])\\ &= ([2:26],[1:100])\\ (p &= 1,\ 2,\ 3,\ 4)\end{aligned}$$

Further, by applying the subscript reverse function inv_f to the GIXS_A(p), it is possible to obtain the VGITS_A(p) as follows.

$$VGITS\_A(1) = inv\_f(GIXS\_A(1))$$
$$= ([2:26], [1:100])$$
$$VGITS\_A(2) = inv\_f(GIXS\_A(2))$$
$$= ([27:51], [1:100])$$
$$VGITS\_A(3) = inv\_f(GIXS\_A(3))$$
$$= ([52:76], [1:100])$$
$$VGITS\_A(4) = inv\_f(GIXS\_A(4))$$
$$= ([77:101], [1:100])$$

In the process 307, the GITS__A(p) may be obtained as a result of a set of intersections between the VGITS__A(0) and each iteration set ([2:99], [2:100]) of the original loop. Concretely, the GITS__A(p) are as follows.

$$GITS\_A(1) = VGITS\_A(1) \cap ([2:99], [2:100])$$
$$= ([2:26], [2:100])$$
$$GITS\_A(2) = VGITS\_A(2) \cap ([2:99], [2:100])$$
$$= ([27:51], [2:100])$$
$$GITS\_A(3) = VGITS\_A(3) \cap ([2:99], [2:100])$$
$$= ([52:76], [2:100])$$
$$GITS\_A(4) = VGITS\_A(4) \cap ([2:99], [2:100])$$
$$= ([77:99], [2:100])$$

The difference between the VGITS__A(p) and the GITS__A(p) takes place only in the case of p=3 ([77:101], [1:100]) against [77:99], [2:100]). By reflecting this difference (shrinkage of the iteration set) on the VLITS__A(p), the final LITS__A(p) can be obtained as follows.

$$LITS\_A(1) = ([2:26], [2:100])$$
$$LITS\_A(2) = ([2:26], [2:100])$$
$$LITS\_A(3) = ([2:26], [2:100])$$
$$LITS\_A(4) = ([2:26-2], [2:100])$$
$$= ([2:24], [2:100])$$

As a result of the process 108 for obtaining the LITS, the declaration of the array A and the iteration set of the DO loop are shown in a node program 4114 of each PE.

In general, the LITS may be replaced in each assignment statement. The conventional method, therefore, is unable to treat the following two cases. That is, these cases are one case in which each assignment statement in the same loop has the same GITS and the other case in which the loop is distributable if each assignment has the corresponding GITS and each assignment statement in the loop is made to have the same GITS as a result of the loop distribution.

FIGS. 5A to 5C show the GITS having variable assignment statements in the same loop, which GITS may be partitioned. Numeral 501 in FIG. 5A denotes the original sequential source program. Numeral 502 in FIG. 5B denotes a data partition attribute of the array A. Numeral 503 denotes a data partition attribute of the array B. Numeral 5114 in FIG. 5C denotes a node program of each PE obtained as a result of partitioning the program.

When the sequential source program 501 is partitioned, the array A is distributed to four PEs according to the data partition attribute 502, while all the array data B is distributed to four PEs straightforward, that is, without partitioning the data according to the data partition attribute 503. The assignment statement for the array A does not depend on the assignment statement for the array B. Hence, the loop 500 may be distributed for creating a loop for each assignment statement.

In the node program 5114 of each PE, a loop 510 for assignment to the array A has a loop iteration set of a loop control variable I ranging from 1 to 4 or a loop 520 for assignment to the array B has a loop iteration set of a loop control variable ranging from 1 to 16.

Further, in another paper of Seema Hiranandani, Ken Kennedy and Chau-Wen Tseng: "Compiling FORTRANT D for MIND Distributed-Memory Machines", COMMUNICATIONS OF THE ACM, August 1992, Vol. 35, No. 8, pp 66 to 80, a sum set ULITS of LITS of assignment statements (when ULITS is made to be an arithmetic progression) is taken and each assignment statement is set to execute only the original corresponding LITS of the ULITS.

FIGS. 6A to 6C show how a program is partitioned if each assignment statement in the same loop has the corresponding GITS. Numeral 601 in FIG. 6A denotes an original sequential source program. Numeral 602 in FIG. 6B denotes an array data partition attribute. Numeral 6114 in FIG. 6C denotes a node program of each PE obtained as a result of partitioning computation.

When the sequential source program 601 is partitioned, the array A is distributed to four PEs according to the data partition attribute 602.

An assignment statement 604 is LITS__A(p)=[1:4] and an assignment statement 605 is LITS__A(p)=[13:16]. Hence, the sum set ULITS__A(p) of them is ULITS__A(p)=[1:4] $\cup$ [13:16]. The loop iteration set covers the set of [1:16] in which the sum set is continuous. As a result of partitioning computation, a node program of each PE is denoted by 6114.

In the conventional method for partitioning computation, if each array appearing in the left side of the plural assignment statements in a loop is partitioned by the corresponding partitioning method, that is, arrays are partitioned by respective methods, though the GITS corresponding to the LITS is proper to each assignment statement, the LITS is shared by each assignment statement. Hence, in each processor, the execution sequence between the assignment statements is different from that of the original sequential program, so that the result may be incorrect.

FIGS. 7A to 7C show an example in which at each time of a loop of each processor, the execution sequence between the assignment statements is different from that of the sequential execution sequence, because a method for partitioning an array appearing in the left side of an assignment statement is different from another though they are contained in the same loop. Numeral 701 of FIG. 7A denotes an original sequential source program. Numerals 702 and 703 of FIG. 7B denote an array data partition attribute. Numeral 7114 of FIG. 7C denotes a node program of each PE obtained as a result of partitioning computation.

When the sequential source program 701 is partitioned, based on the data partition attribute 702 of the array A and the data partition attribute 703 of the array B, for the assignment statement 704, LITS__A(p)=[1:4] is derived. For the assignment statement 705, LITS__B(0)=[1:4] is derived. Hence, the loop iteration set of the loop control variable 1 in the loop 700 ranges from 1 to 4.

In the processor PE1, the computation of A(1) and B(1) when I=1 is given are executed and the computation of A(2) and B(5) when I=2 is given are executed.

In the computation of B(5), however, A(4) defined when I=4 is given has to be used. Hence, A(4) undefined in the computation of B(5) has to be used. The result, therefore, is made incorrect.

Further, in a case that each array appearing in the left side of the assignment statement has the corresponding subscript expression as shown in FIG. 6A, as mentioned above, the loop iteration set is magnified. Actually, the loop in which the assignment statement is not executed is not iterated (for example, when I=5 to 12 in the DO loop of the node program 6114 of FIG. 6C). This is the waste of loop iterations, which becomes an obstacle to improving the performance.

SUMMARY OF THE INVENTION

It is a main object of the present invention to provide a method for partitioning computation having an improved program execution speed in the case of converting a program for a single processor into a partitioning computation for a parallel computer.

It is another object of the present invention to provide a method for partitioning program which brings about no incorrect result in the case of converting a program for a single processor into a partitioning computation for a parallel computer.

The main object of the present invention is achieved by preventing execution of idle loop iteration resulting from magnification of the loop iteration set caused by variable subscript expressions of an array appearing in the left side of an assignment statement included in the partitioned computation obtained by the conversion.

The other object of the present invention is achieved by eliminating appearance of the incorrect result caused by not providing an identical partitioning method for an array appearing in the left side of an assignment statement included in the partitioned computation obtained by the conversion.

The disadvantage that an idle loop iteration is executed entailed in the conventional computation partition method is brought about by forming a sum set of LITS' exclusive to and non-connected to each other as the connecting set. Further, the disadvantage that the incorrect result takes place is brought about by using the LITS in the loop iteration set in the partitioning computation.

The present invention is, therefore, characterized by setting as a new array a sum set of GITS in plural loop iteration set in the same loop in the partitioning computation and using an index of the new array as an index of a loop iteration set.

According to the present invention, for each processor, a sum set of loop indexes given when data assigned to each assignment statement in a loop is allocated to the processor is obtained as a list vector. Hence, the sum set of GITS for the corresponding assignment statements is made to be a loop iteration set so that the LITS is not shared though variable GITS' are provided unlike the prior art. As such, the incorrect result is not brought about.

Further, if the LITS for each assignment statement is exclusive to that for another assignment statement and the LITS is not made continuous, the loop is iterated only the same times as an element number of the list vector. Moreover, since the assignment statement is not executed only when the list vector value is included in the GITS, no idle loop iteration is carried out.

BRIEF DESCRIPTION OF THE DRAWINGS

FIG. 2 is an explanatory view showing a subscript function and its reverse function;

FIGS. 6A, 6B and 6C are views showing an example having variable GITS;

FIGS. 7A, 7B and 7C are views showing an example having variable array data partition attribute;

FIGS. 8A and 8B are a flowchart showing a procedure of statically partitioning computation in the converting system shown in FIG. 1;

FIGS. 9A and 9B are a flowchart showing a procedure of dynamically partitioning computation in the converting system shown in FIG. 1;

FIGS. 10A and 10B are a flowchart showing a procedure of creating a static list vector calculating process in the converting system shown in FIG. 1;

FIGS. 11A and 11B are a flowchart showing a procedure of creating a dynamic list vector calculating process in the converting system shown in FIG. 1;

FIG. 20 is a view showing a program to be executed after a program of the example program shown in FIGS. 7A to 7C is statically partitioned;

FIG. 21 is a view showing a parallel node program for statically partitioning computation of the example program shown in FIGS. 7A to 7C;

FIG. 22 is a view showing a program to be executed after dynamically partitioning computation of the example program shown in FIGS. 7A to 7C;

FIG. 23 is a view showing a parallel node program for dynamically partitioning computation of the example program shown in FIGS. 7A to 7C;

FIG. 24 is a view showing a parallel node program for statically partitioning computation of the example program shown in FIGS. 6A to 6C.

DESCRIPTION OF THE PREFERRED EMBODIMENT

Figure 25A:
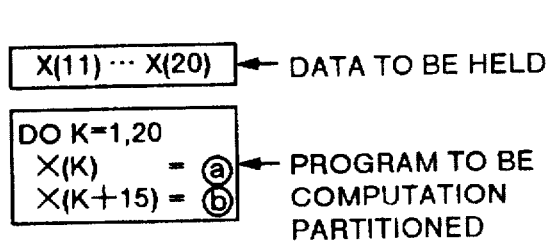
FIGS. 25A, 25B and 25C are explanatory views showing the concept of the present invention.
Figure 25C:
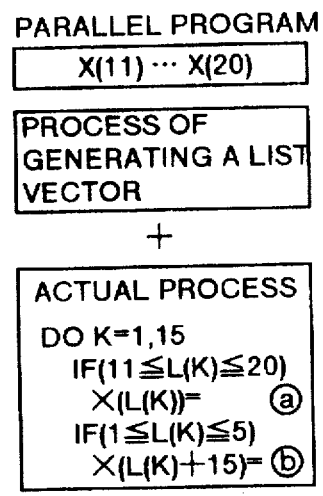

Before describing the embodiment of the present invention, the concept of the present invention will be described with reference to FIGS. 25A, 25B and 25C.

If plural assignment statements are given in the same loop and each loop iterating set is given to the corresponding assignment statement, the present invention is arranged to sort the loop iteration times, store it in a list vector and set an element length of the list vector as a loop iteration set so that an array subscript of each statement may refer to an element of the list vector. This method makes it possible to eliminate the idle loop iteration by storing only the loop iteration times to be executed in the list vector.

To begin with, the conventional method is used for obtaining the loop iteration set. That is, the DO loop is partitioned on the computation partitioning rule of "The computation of a statement is executed by a PE having a storage area to which an array element in the left side of the statement is allocated", in other words, "each PE rewrites its own data by itself".

For that purpose, at first, the loop iteration set for rewriting its own data is derived for each statement. In FIG. 25A, now, the data held by this PE ranges from X(11) to X(20). In the statement (a), the value is rewritten in X(K). Since the loop ranges from 1 to 20, only when K ranges from 11 to 20, the data owned by the PE is rewritten. In the statement (b), the value is rewritten at X(K+15) and the data owned by the PE itself is rewritten only when K ranges from 1 to 5.

Figure 25B:
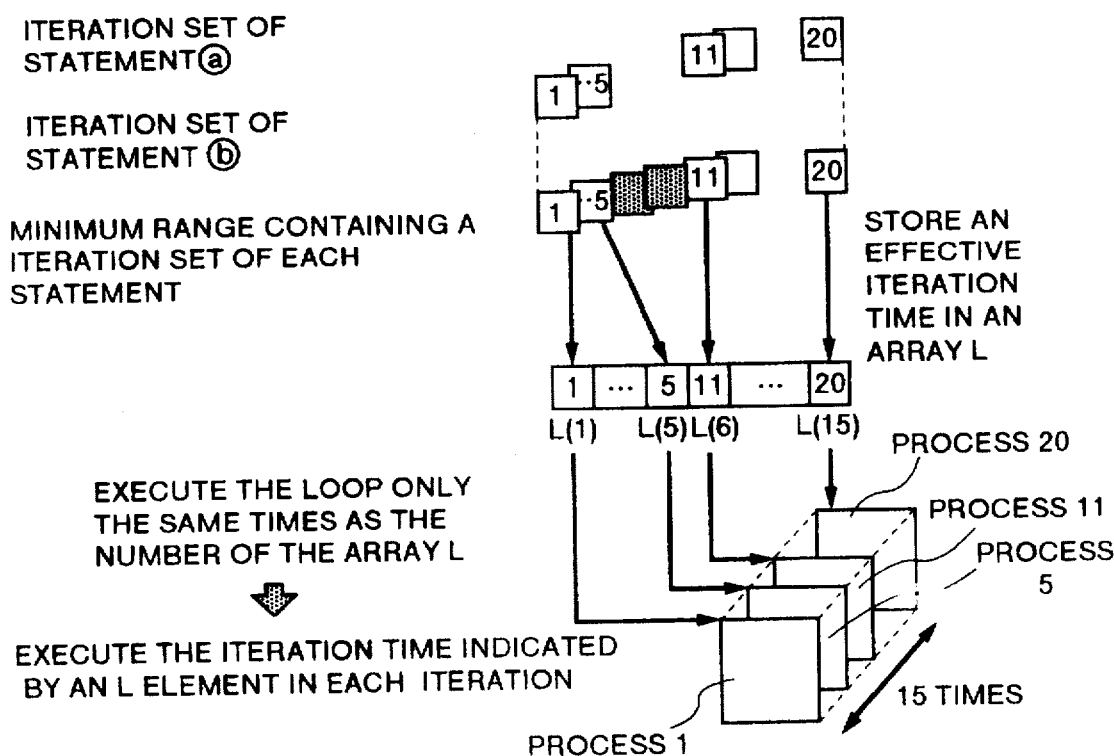

Next, as shown in FIG. 25B, if the minimum range containing the loop iteration set of each statement is derived in a manner to make any one of the statements executable, K reaches any value ranging from 1 to 20. Herein, such an idle loop iteration not executing any statement exists between 5 and 11. This delays an execution time of the program.

Then, the present invention shown in FIG. 25B is proposed for eliminating this idle loop iteration. This invention operates to store the effective loop iteration time in an array L called as a list vector. And, the loop is executed the same times as the number of elements of the array L. As each loop iteration is executed, the loop iteration time indicated by the element of L is executed. As shown in the actual process inside of the parallel program shown in FIG. 25C, the conversion of the array subscript of each statement is executed from X(K) to X(L(K)). Hence, if a sum set of the loop iteration set of each statement is magnified and approximated (if the sum set of the loop iteration set of each statement (a) or (b) is taken, the non-connected ranges from 11 to 20 and from 1 to 5 are provided. If the minimum range containing the loop iteration set of each statement is arranged to make the loop iteration K continuous, the minimum range covers from 1 to 20), the loop iteration times are reduced from 20 to 15.

The parallel program obtained by the present invention mentioned above is composed of a process of creating a list vector and an actual process of referring to a list vector.

Later, an embodiment of the present invention will be described with reference to FIG. 1 and FIGS. 8 to 24.

Figure 1:
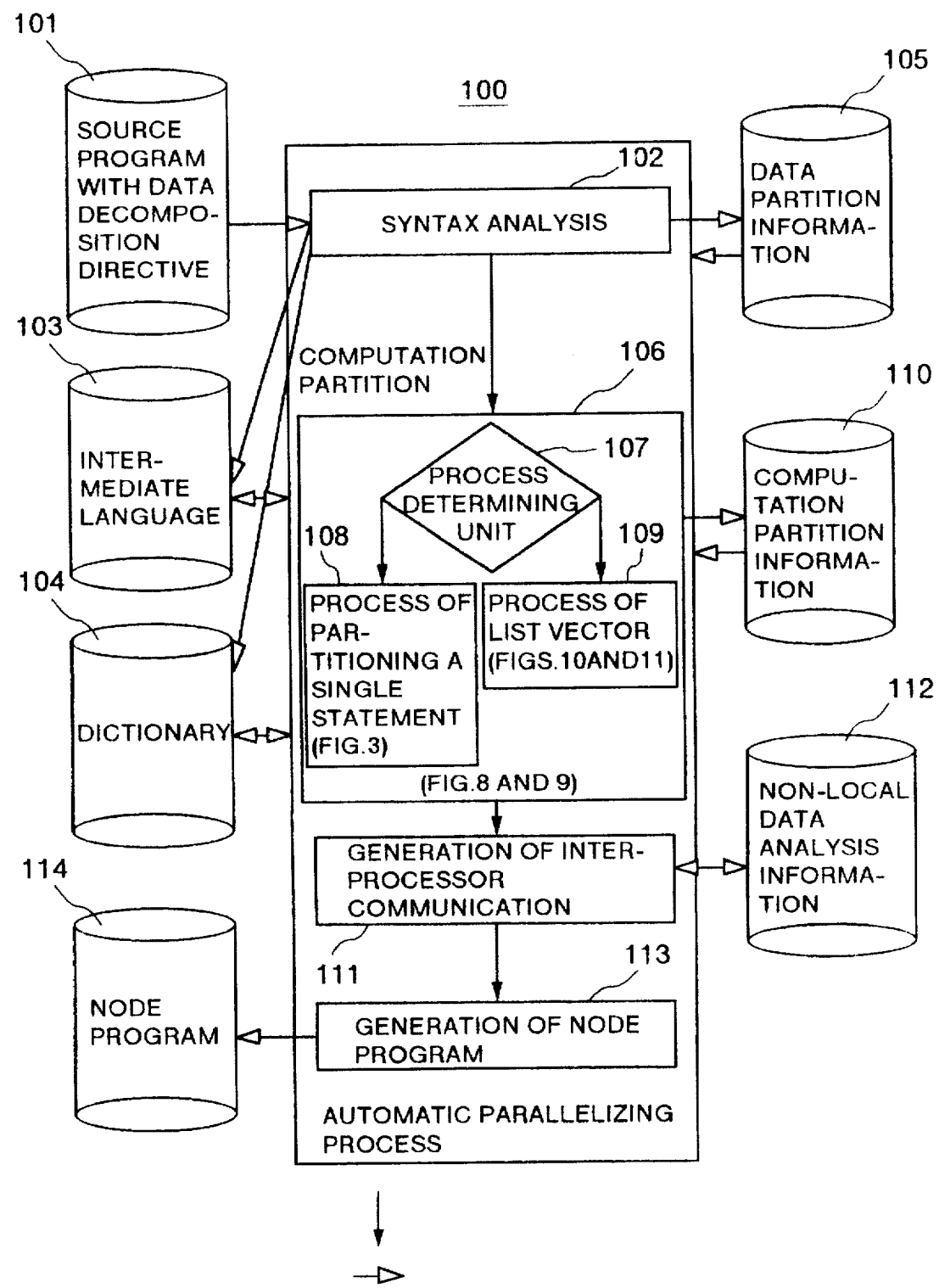
FIG. 1 is a schematic view showing a procedure to be executed in an automatic parallel type converting system to which a computation partition method of the present invention applies.

FIG. 1 schematically shows a procedure executed in the automatic parallel type converting system to which a computation partitioning method of the invention applies.

In a computer 100 for doing an automatic parallelizing process, at first, a syntax analyzing process 102 inputs a source program 101 with directive of partitioning data and oriented for a single processor, converts the source program 101 into a intermediate language 103, registers the converted middle language 103 in a register 104, and set data partition information 105.

Next, the operation is directed to a computation partitioning process 106 (see FIGS. 8 and 9). This middle language 103 and the data partition information 105 are input to the computation partitioning unit. Then, a computation partitioning process determining unit 107 operates to determine the input data to determine if the process to be executed is a computation partitioning process 108 (see FIG. 3) in a single statement or a computation partitioning process 109 (see FIGS. 10 and 11) by using a list vector. The determined process is executed. The result is stored as computation partition information so as to change the intermediate language 103 and a dictionary 104 or add data to them.

Next, the computation partition information 110, the middle language 103 and the data partition information 105 are input for analyzing whether or not non-local data is included in the information. Then, the non-local data analyzing information 112 is set. Next, an inter-processor communicating and generating process 111 is executed and the middle language 103 is changed. The non-local data means data which is not stored in a local memory of a subject processor itself (that is, the data required to be obtained from another process through the effect of the communication).

This intermediate language 103, the dictionary 104, the data partition information 105 and the computation partition information 110 are inputted. With these pieces of information, a process 113 for generating a node program is executed so as to output a node program to be operated by each processor.

In turn, the description will be oriented to various kinds of information used in the computation partitioning process 106 shown in FIG. 1.

Figure 12:
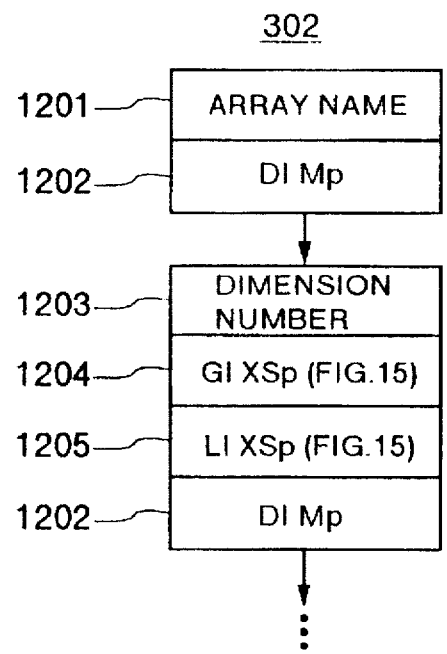
FIG. 12 is a diagram showing a data partition table contained in data partition information 105 shown in FIG. 1.

FIG. 12 shows a data partition expression table 302 contained in the data partition information 105. The data partition expression table 302 is a table for storing a GIXS and an LIXS in each dimension of each array in a source program (concretely, storing pointers to the GIXS and the LIXS).

The data partition expression table 302 includes an array name 1201 and a pointer DIMp 1202 to each dimension of the array. The information at each dimension indicated by the pointer DIMp 1203 includes a dimension number 1203, a pointer GIXSp 1204 to the GIXS (see FIG. 15), a pointer LIXSp 1205 to the LIXS (see FIG. 15), and a pointer DIMp 1202 to the next dimension.

Figure 13:
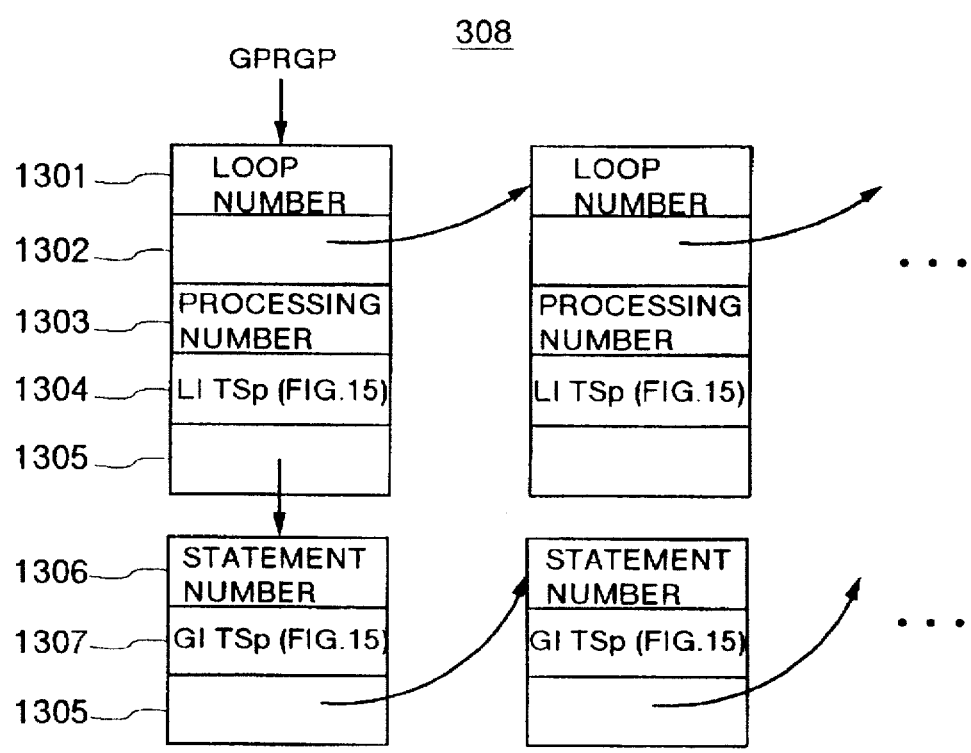
FIG. 13 is a diagram showing a CMP partition expression table contained in program partition information 110 shown in FIG. 1.

FIG. 13 shows a CMP computation partition expression table 308. The CMP partition expression table 308 is a table for storing data about partition of each loop for the computation partition.

That is, the CMP partition expression table 308 includes a loop number 1301, a pointer 1302 to the data about the next loop, a process number 1303, a pointer LITSp 1304 to the LITS (see FIG. 15), and a pointer 1305 to the statement contained in the loop. The process number 1303 is a number for indicating if the computation partitioning process about the loop is a process for a single assignment statement, a process to be done by a static list vector, or a process to be done by a dynamic list vector. The procedure of each process will be discussed below.

The data about the statement in the loop indicated by the pointer 1305 includes a statement number 1306, a pointer GITSp 1307 to the GITS (see FIG. 15) for this statement, and a pointer 1305 to the next statement.

Figure 14:
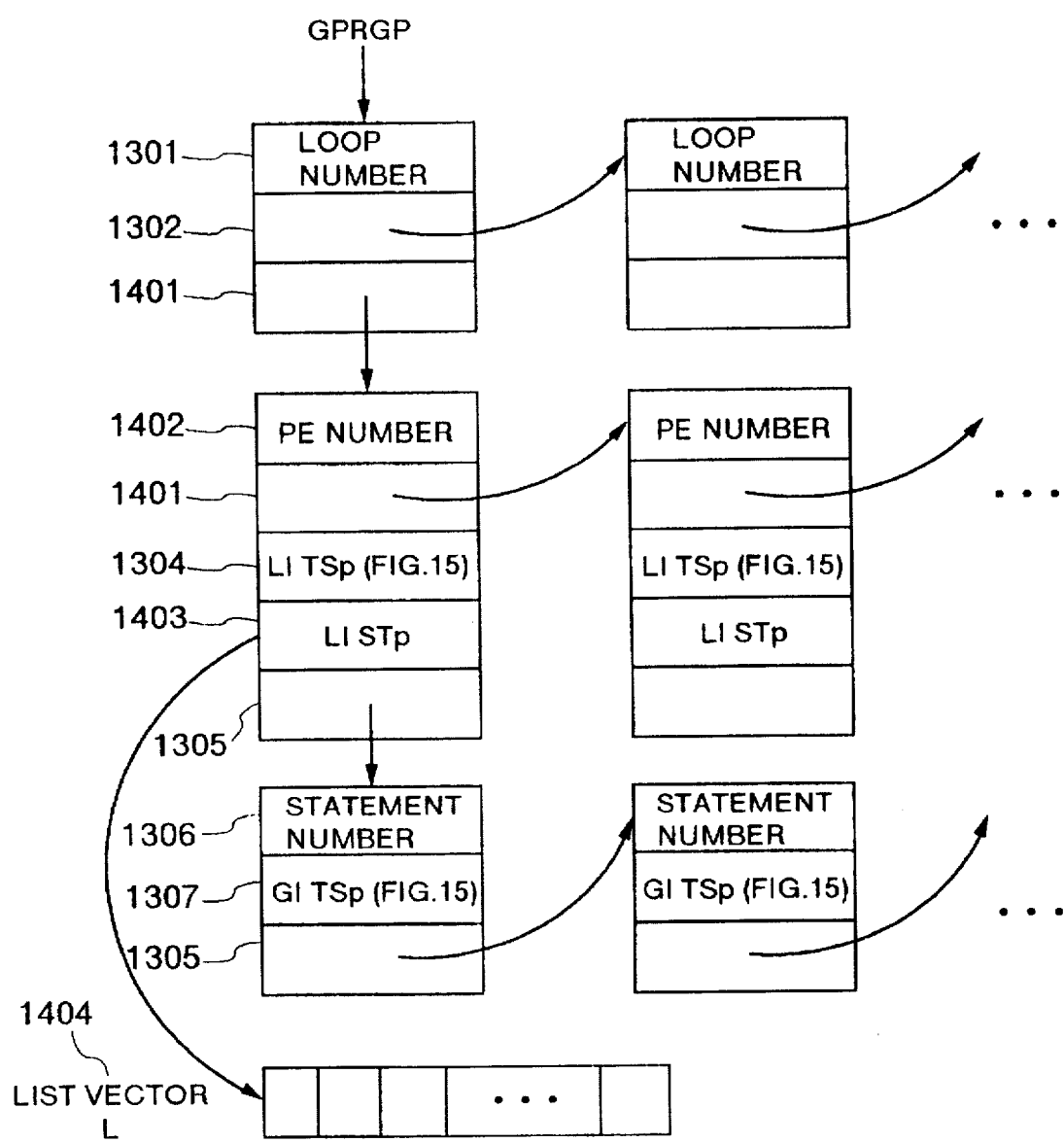
FIG. 14 is a view showing a CMP partition value table contained in computation partition information 110 shown in FIG. 1.

FIG. 14 shows a CMP partition value table 808 of the computation partition information. The CMP partition value table 808 is a table for storing data about partition of each loop for the computation partition. The table stores the similar data to the CMP partition expression table shown in FIG. 13. However, though the CMP partition expression table stores a LITS of each loop or a GITS of each statement in the form of an expression, the CMP partition value table shown in FIG. 14 stores it in the form of concrete values.

The CMP partition value table 808 includes a loop number 1301, a pointer to the next loop 1302, and a pointer 1401 to the table about a LITS for each processor.

The information about the LITS for each processor indicated by the pointer 1401 contains a processor (PE) number 1402, a pointer 1401 to LITS information of the next processor, a pointer LITSp 1304 to the LITS (see FIG. 15), a pointer LISTp 1403 to the list vector L1404, and a pointer 1305 to a statement contained in a loop.

The information about a statement in a loop indicated by the pointer 1305 contains a statement number 1306, a pointer GITSp 1307 to the GITS (see FIG. 15), and a pointer 1305 to the next statement.

The list vector is a one-dimensional array provided to correspond to each loop. The number of elements in the array is equal to the iteration times of the corresponding loop. In each element of the list vector, the GITS of each assignment statement in the loop is sorted and then stored. The list vector will be discussed in detail below with reference to the concrete examples.

Figure 15:
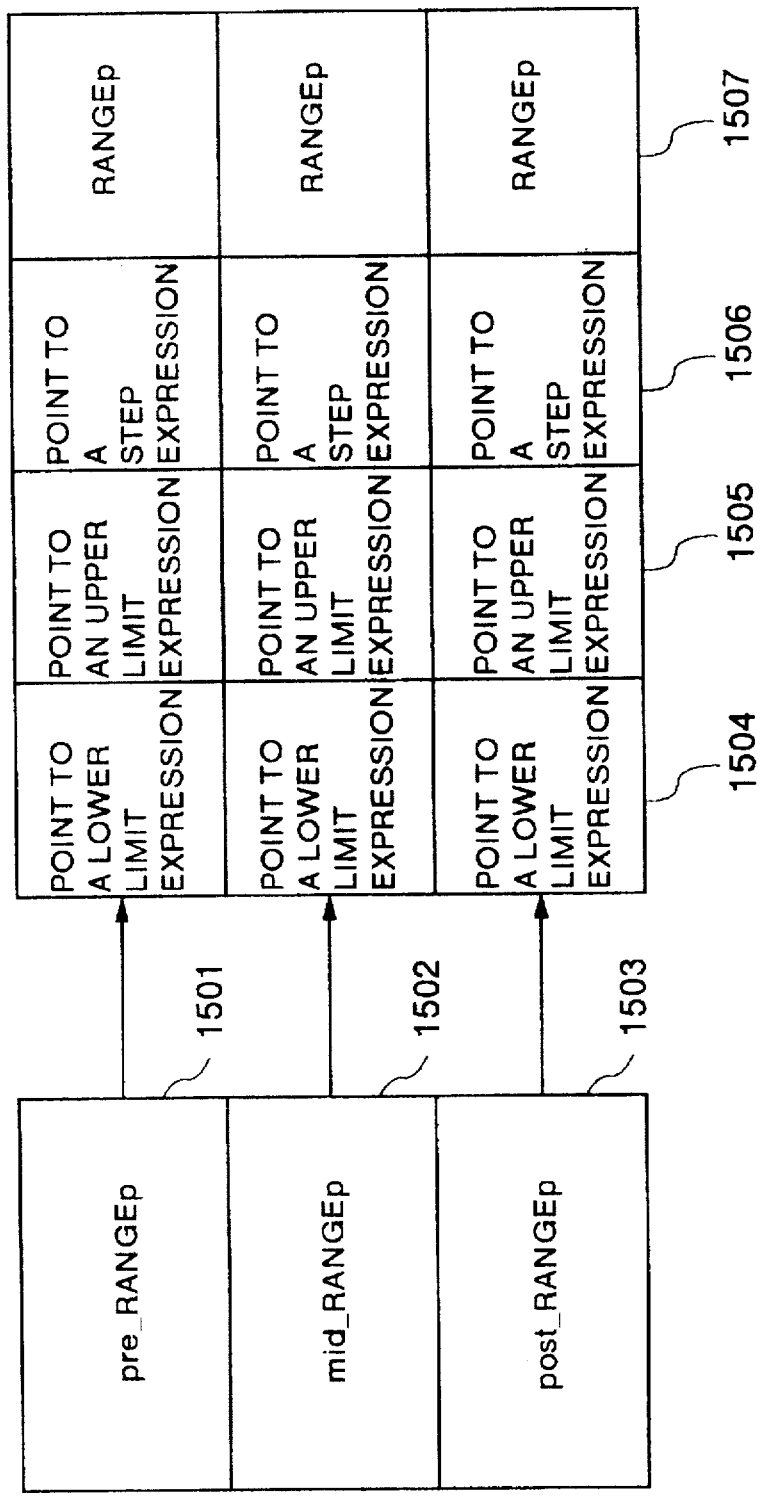
FIG. 15 is a view showing GIXS and LIXS tables of the data partition information 105 shown in FIG. 1 and GITS and LITS tables of the computation partition information 110 shown in FIG. 1.

FIG. 15 shows the tables indicated by the pointers GIXSp 1204, LIXSp 1205, LITSp 1304 and GITSp 1307 mentioned above.

They may be represented by a common table. The common table includes a pointer pre_RANGEp 1501 to a range expression of a head processor, a pointer mid_RANGEp 1502 to a range expression of a middle processor, a pointer post_RANGEp 1503 to a range expression of an end processor.

The range expression includes a pointer 1504 to a lower limit expression, a pointer 1505 to an upper limit expression, a pointer 1506 to an increment expression, and a pointer 1507 to a next range expression for connecting the non-connected range expressions by a list. The non-connected range expressions are not represented by an arithmetic progression.

Next, the computation partitioning process 106 shown in FIG. 1 will be discussed in detail. Herein, as a process of partitioning computation, two processing systems will be proposed, that is, a process of statically partitioning computation and a process of dynamically partitioning computation. The process of statically partitioning computation is computation partitioning process to be done if a loop iteration set is established when compiling the source program. The process of dynamically partitioning computation is a computation partitioning process for establishing a loop iteration set when the computation is executed.

At first, the description will be oriented to the process of statically partitioning computation.

FIGS. 8A and 8B show a procedure of statically partitioning computation in the computation partitioning unit 106. The computation partitioning unit 106 receives the middle language 103, the dictionary 104, and the data partition information 105. Then, the partition unit 106 starts to do the process.

At first, a termination determining unit 801 determines whether or not the program is terminated. If yes, it means that the computation partitioning process 106 is terminated. If no, a process 802 of finding a next loop in the source program is executed.

If the loop is found, it is determined if the loop has one or plural assignment statements (803). If just one assignment statement is found in the loop, the conventional method may be used for partitioning computation. That is, the process 108 (see FIG. 3) is executed to refer to the data partition expression table 302 (see FIG. 12) and a global function 304 in the data partition information 105 for calculating the GITS of the assignment statement and to write the calculated result to the CMP partition expression table 308 (see FIG. 13) in the computation partition information 110.

Further, the LITS is calculated. The calculated result and a computation partitioning process number 0 are written in the CMP partition expression table 308 (see FIG. 13). Then, the operation returns to the process 801. The computation partitioning process number 0 explicitly indicates that the process of partitioning computation is a method for a single assignment statement.

Figures 5A, 5B, 5C:
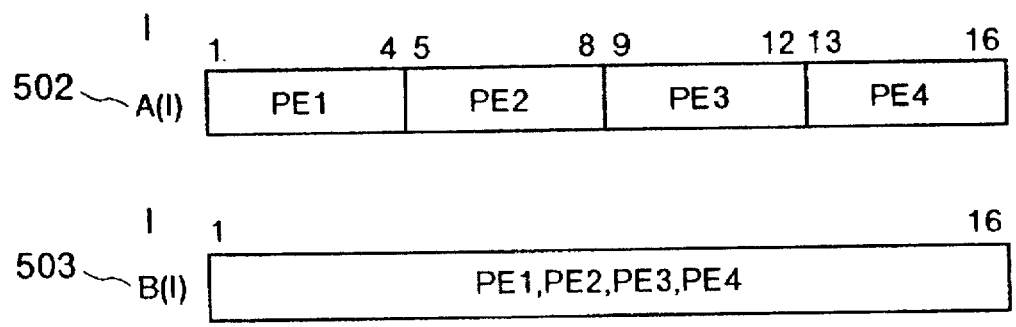
FIGS. 5A, 5B and 5C are views showing an example in which a loop is distributable.

On the other hand, if the loop has plural assignment statements, a loop distribution determining unit 804 determines whether or not the loop may be distributed. If yes, a loop distribution process 805 is executed according to the process described with reference to FIGS. 5A to 5C. Again, each of the distribution loop units is determined (803).

If the loop may not be distributed, the process 198 (see FIG. 3) is executed to refer to the data partition expression table 302 (see FIG. 12) and the global function 304 of the data partition information 105 and calculate the GITS of each assignment statement. The calculated result is written in the CMP partition expression table 308 (see FIG. 13). Then, it is determined whether or not the GITS' of all assignment statements are equal to one another (806).

If they are equal to one another, the same process as that for the single assignment statement is executed. That is, the process 108 (see FIG. 3) is executed to calculate the LITS and write the calculated result in the CMP partition expression table 308 (see FIG. 13) and the computation partitioning process number 0.

If the GITS's of the assignement statements are respective, a process 807 of statically calculating a list vector by referring to the CMP partition expression table 308 (see FIG. 13) and write the calculated result in the CMP partition value table 808 (see FIG. 14). Again, the operation returns to the determination process 801. The process of statically calculating a list vector will be discussed in detail.

Next, the description will be oriented to the process of dynamically partitioning computation.

FIGS. 9A and 9B show a process of dynamically partitioning computation. The process shown in FIG. 9 is substantially same as the process of statically partitioning computation as shown in FIG. 8, except the following respect. That is, in place of the statical list vector calculating unit 807 (see FIG. 10), a dynamic list vector calculating unit 901 (see FIG. 11) is used. The computation partition expression table 308 (see FIG. 13) of the computation partition information 110 is input to the unit 308 so that a middle language for newly doing a process of dynamically calculating a list vector may be added to the middle language 103. The list vector dynamic calculating unit 901 will be discussed in detail below.

Figure 10B:
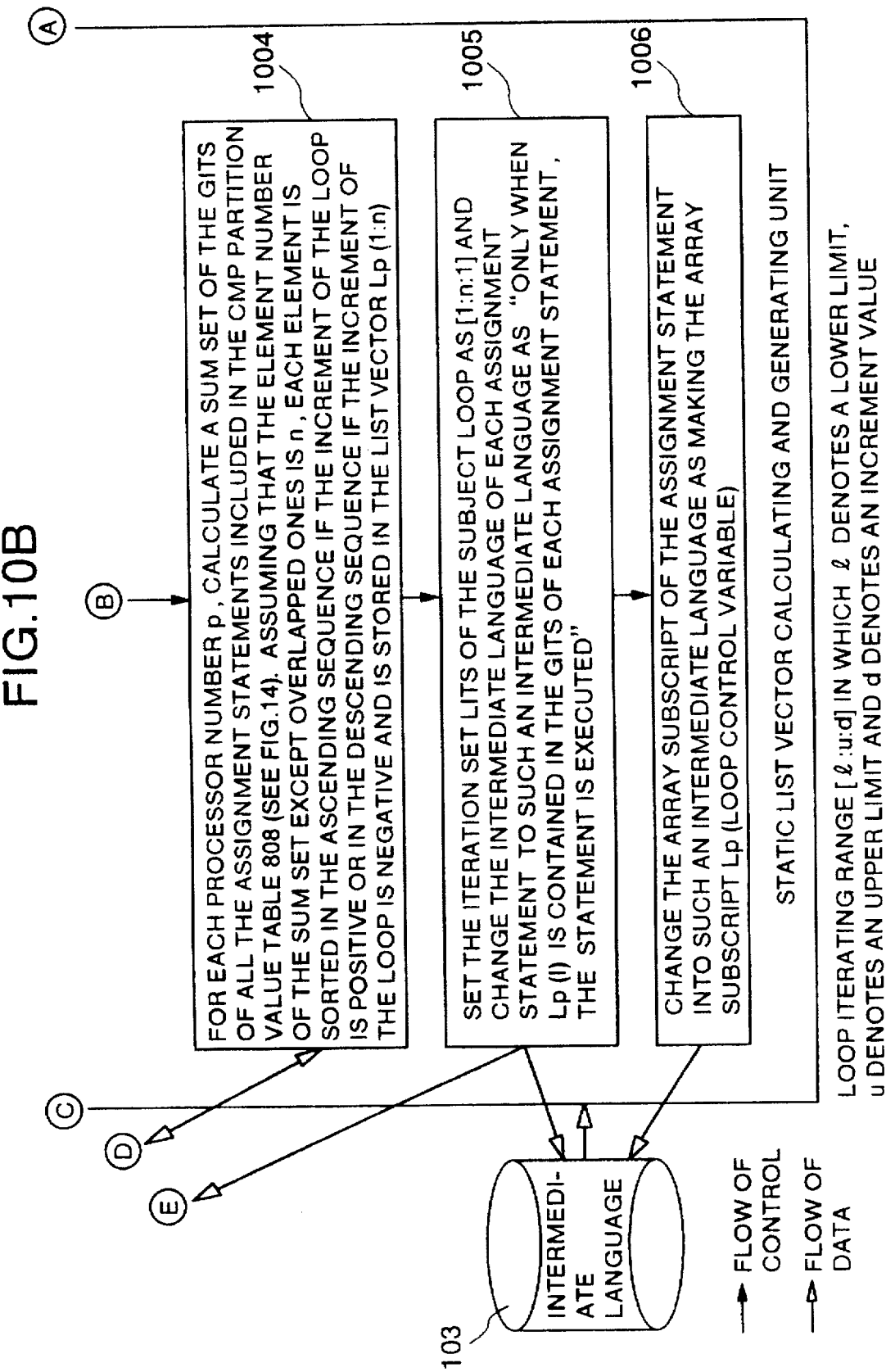

FIGS. 10A and 10B show a detailed process of statically calculating a list vector. The list vector static calculating unit 807 receives the middle language 103, the CMP partition expression table 308 (see FIG. 13) of the computation partition information 110, changes the middle language 103, and adds the CMP partition value table 808 (see FIG. 14) to the computation partition information 110.

At first, a value of 1 is set to a process number of the CMP partition expression table 308 (see FIG. 13) of the computation partition information 110. Then, a process 100 is executed to copy a loop number and a statement number of the CMP partition expression table 308 (see FIG. 13) to the CMP partition value table 308 (see FIG. 14). The value of 1 set to the process number explicitly indicates that the process of partitioning computation is a method for a static list vector.

Next, for each processor, a process 1002 is executed to calculate a concrete value of a GITS from the CMP partition expression table 308 (see FIG. 13) and store the calculated result in the CMP partition value table 808 (see FIG. 14).

Next, a process 1003 is executed to prepare the same number of the arrays corresponding to the size (element number) of the original loop iteration times as the processors as a list vector. The list vector is prepared in the CMP partition value table 808 (see FIG. 14). Then, a process 1004 is executed. That is, for each processor number p, a sum set of the GITS' of all the assignment statements included in the CMP partition value table 808 (see FIG. 14) is calculated. Assuming that the element number of the sum set except overlapped ones is n, each element is stored in the list vector Lp (1:n) corresponding to the processor number p. When storing it, if the increment of the original loop is positive, those elements are sorted in the ascending order, while if it is negative, those elements are sorted in the descending order.

Next, a process 1005 is executed to set the local iteration set LITS of the subject loop as [1:n:1] and change the middle language of each assignment statement to such a middle language as "only when Lp(I) is contained in the GITS of each assignment statement, the statement is executed". In the loop iteration set [1:u:d], 1 means a lower limit, u means an upper limit, and d means an increment. I denotes a loop index variable (loop control variable) of the subject loop.

Lastly, a process 1006 is executed to change the middle language into such one as making the array subscript of the assignement statement Lp(I).

Figure 11B:
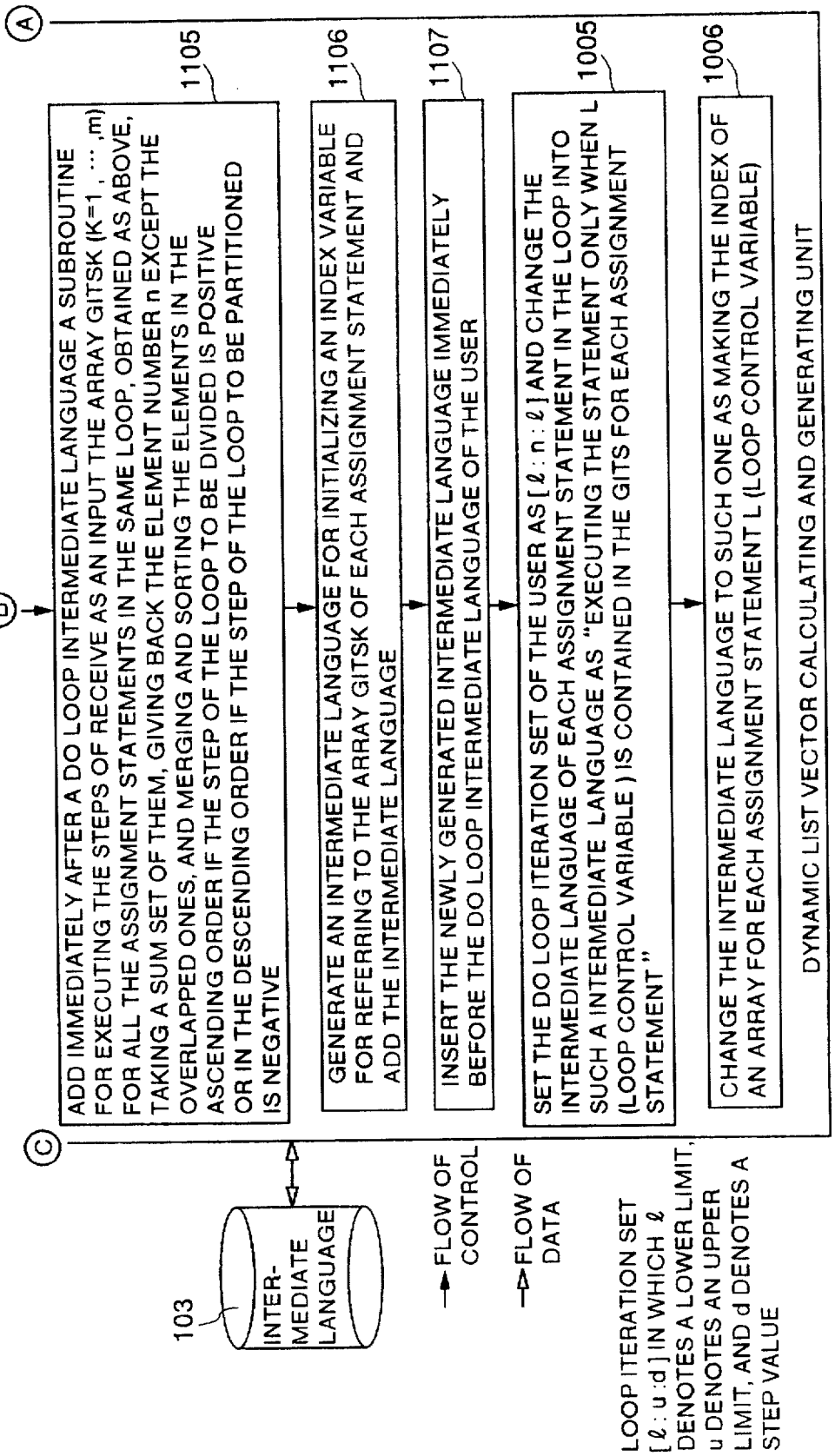

FIGS. 11A and 11B show a detailed process of dynamically calculating a list vector. The list vector dynamic generating unit 901 receives the middle language 103 and the computation partition information 110.

First, a process 1101 is executed to set to 2 a process number of the CMP partition expression table 308 (see FIG. 13) of the computation partition information 110. This explicitly indicates that the computation partitioning process is a method based on the dynamic list vector.

Next, a process 1102 is executed to set a number of the assignment statements in the loop as m, declare the array GITSk (k=1, . . . , m), and register it in a dictionary 104. The size (element number) of each array GITSk (k=1, . . . , m) is the same as the size of the element number of each GITSk (k=1, . . . , m) of the CMP partition expression table 308 (see FIG. 13).

For each assignment statement (k=1, . . . , m), a process 1103 is executed to refer to a range expression of GITSk in the CMP partition expression table 308 (see FIG. 13), generate a loop intermediate language and connect the intermediate language 1104 to the loop intermediate language so that the intermediate language 1104 may be a statement in the loop. The intermediate language 1104 is "an index I of the array GITSk for each assignment statement (k=1, . . . , m) is incremented by 1 and the value of the loop index at this time is stored in the GITSk(I)". In other words, the process 1103 is executed to generate such an intermediate language as deriving a concrete value of a GITS for each assignment statement (k=1, . . . , m) and storing it in the array GITSk(I).

Then, a process 1105 is executed to add a subroutine immediately after the DO loop intermediate language added in the process 1103. The subroutine takes the steps of receiving as an input the array GITSk (k=1, . . . , m) for all the assignment statements in the same loop, obtained in the process 1103, taking a sum set of them, giving back the element number n except the overlapped ones, merging and sorting the elements in the ascending order if the increment of the loop to be divided is positive or in the descending order if the increment of the loop to be divided is negative, and setting the result to the array L of the list vector. In the process 1103, the intermediate language for setting the list vector L is added after the intermediate language generated in the process 1103.

Then, a process 1106 is executed to generate a middle language for initializing an index variable for referring to the array GITSk of each assignment statement and add the intermediate language after the intermediate language generated in the process 1105. A process 1107 is executed to insert the intermediate languages newly generated in the processes 1103, 1105, and 1106 immediately before the Do loop intermediate language of the user.

Next, a process 1005 is executed to set the DO loop iteration set of the user as [1:n:1] (meaning ([lower limit:upper limit:increment]) and change the intermediate language of each assignment statement in the loop into such an intermediate language as "executing the statement only when L(I) is contained in the GITS for each assignment statement". Symbol I denotes a loop index variable (loop control variable) of the subject loop.

Lastly, a process 1006 is executed to change the middle language to such one as making the index of an array for each assignment statement L(I).

This is the end of the process of dynamically calculating a list vector. The process of statically calculating a list vector is executed to derive the concrete values of the list vector and change the program in a manner to allow the values to be referenced. On the other hand, the process of dynamically calculating the list vector is executed to add such an intermediate language as deriving the values of the list vector when executing the program. That is, the concrete values of the list vector are derived when executing the program and are referenced.

In turn, the description will be oriented to an embodiment in which the computation partitioning process 106 about the sequential source program 701 shown in FIG. 7A is executed in the automatic parallelizing process 100 described with reference to FIG. 1 and FIGS. 8 to 11.

Figure 16:
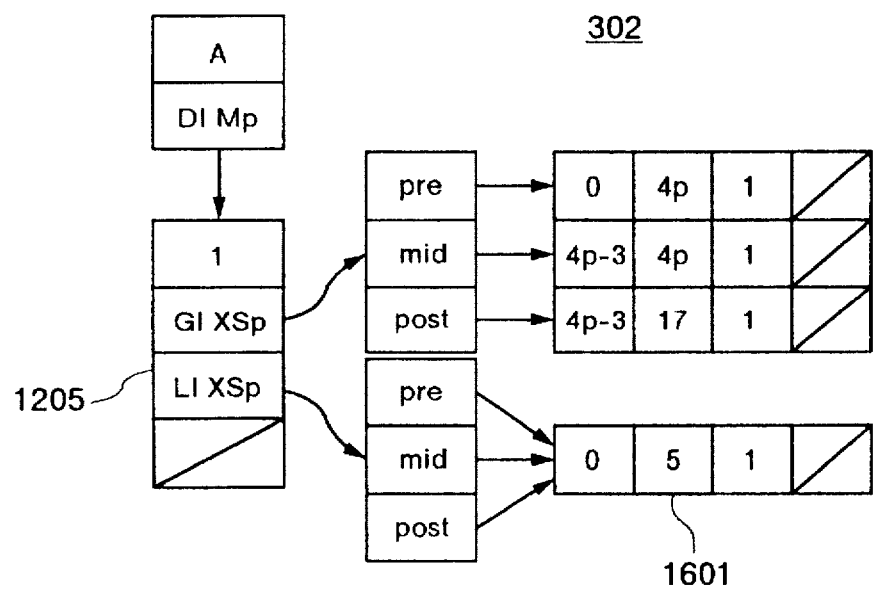
FIG. 16 is a view showing a data partition table of an array A in an example program shown in FIGS. 7A to 7C.

FIG. 16 shows a data partition table of an array A of the sequential source program 701 shown in FIG. 7A. The array A (0:17) is partitioned according to the data partition attribute 702 shown in FIG. 7 in the syntax analyzing process 102 shown in FIG. 1.

The concrete values of the GIXS and the LIXS of the array A are indicated as follows. The GIXS of the array A for the processor p is represented by GIXS_A(p).

$GIXS\_A(1) = \{0, 1, 2, 3, 4\}$ $GIXS\_A(2) = \{5, 6, 7, 8\}$ $GIXS\_A(3) = \{9, 10, 11, 12\}$ $GIXS\_A(4) = \{13, 14, 15, 16, 17\}$ $LIXS\_A(p) = \{0, 1, 2, 3, 4, 5\}$ (p=1, 2, 3, 4)

FIG. 16 shows the data partition table 302 in which these values are written. LIXSp 1205 points to the range expression 1601 common to all the processors. For the explanation's convenience, in FIG. 16, the pointers 1504, 1505 and 1506 shown in FIG. 15 are described as the expressions (or values). This holds true to FIGS. 17 to 19A and 19B.

Figure 17:
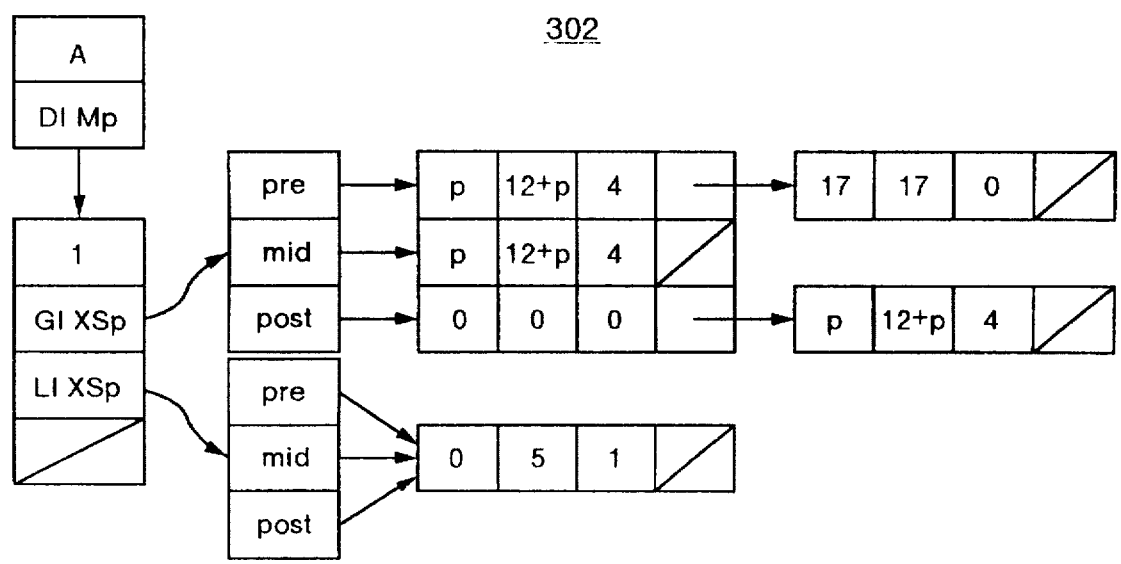
FIG. 17 is a view showing a data partition table of an array B in an example program shown in FIGS. 7A to 7C.

FIG. 17 shows the data partition table of an array B of the sequential source program 701 shown in FIG. 7A. The array B (0:17) is partitioned according to the data partition attribute 703 shown in FIG. 7B in the syntax analyzing process 102 shown in FIG. 1.

The concrete values of the GIXS and the LIXS of the array B are as follows.

$$GIXS\_B(1) = \{1, 5, 9, 13, 17\}$$

$$GIXS\_B(2) = \{2, 6, 10, 14\}$$

$$GIXS\_B(3) = \{3, 7, 11, 15\}$$

$$GIXS\_B(4) = \{0, 4, 8, 12, 16\}$$

$$LIXS\_B(p) = \{0, 1, 2, 3, 4, 5\}$$

The data partition table 302 in which these values are written is shown in FIG. 17.

After the data partition table 302 shown in FIGS. 16 and 17 is created in the syntax analyzing process 102 shown in FIG. 1, the computation partitioning process 106 shown in FIG. 8 (or FIG. 9) is executed. The computation partitioning process 106 is executed to determine whether or not the loop may be distributable in the determining unit 804 after the determining unit 803, because the loop 700 of the sequential source program 701 shown in FIG. 7A contains plural assignment statements. Since the loop is distributable, the process 108 is executed to calculate the GITS of each of the assignment statements 704 and 705.

As the calculating result, the concrete values of the GITS of the statement 704 are as follows.

$$GITS\_A(1) = \{1, 2, 3, 4\}$$

$$GITS\_A(2) = \{5, 6, 7, 8\}$$

$$GITS\_A(3) = \{9, 10, 11, 12\}$$

$$GITS\_A(4) = \{13, 14, 15, 16\}$$

$$GITS\_A(p) = \{4p-3, 4p-2, 4p-1, 4p\}$$

(p=1, 2, 3, 4)

Further, the concrete values of the GITS of the statement 704 are as follows.

$$GITS\_B(1) = \{1, 5, 9, 13\}$$

$$GITS\_B(2) = \{2, 6, 10, 14\}$$

$$GITS\_B(3) = \{3, 7, 11, 15\}$$

$$GITS\_B(4) = \{4, 8, 12, 16\}$$

$$GITS\_B(p) = \{p, 4+p, 8+p, 12+p\}$$

(p=1, 2, 3, 4)

Figure 3:
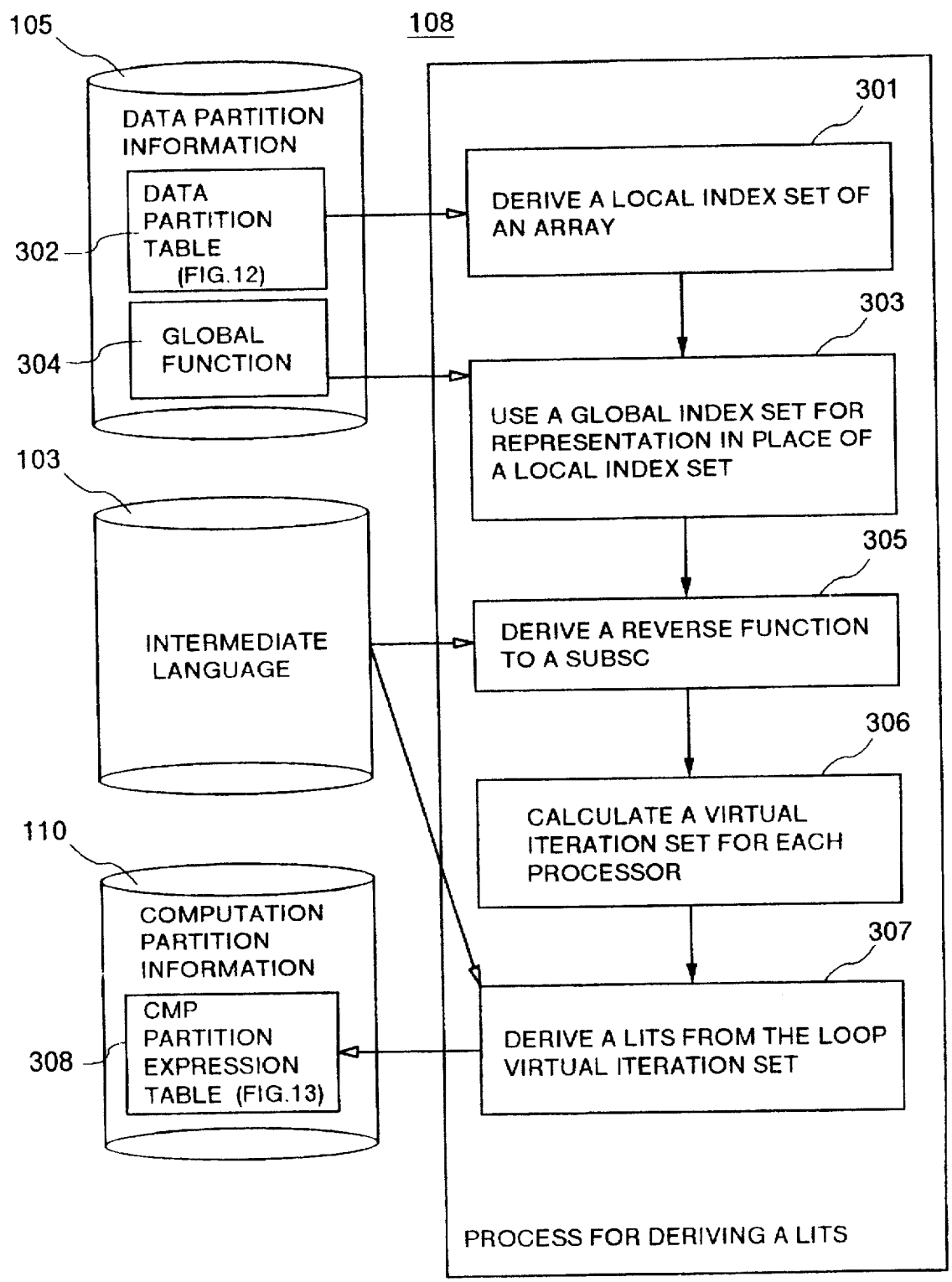
FIG. 3 is a view showing a process for obtaining a LITS in the converting system shown in FIG. 1.
Figures 4A, 4B, 4C:
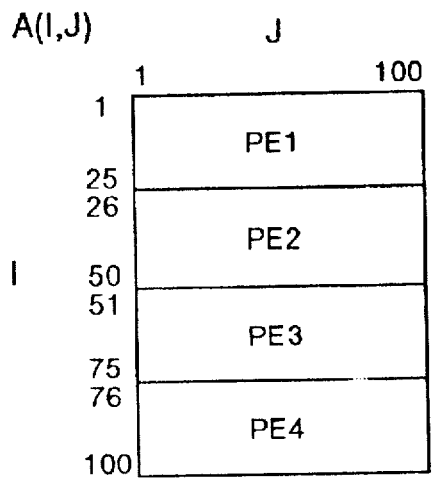
FIGS. 4A, 4B and 4C are views showing an example of obtaining a LITS.
Figure 18:
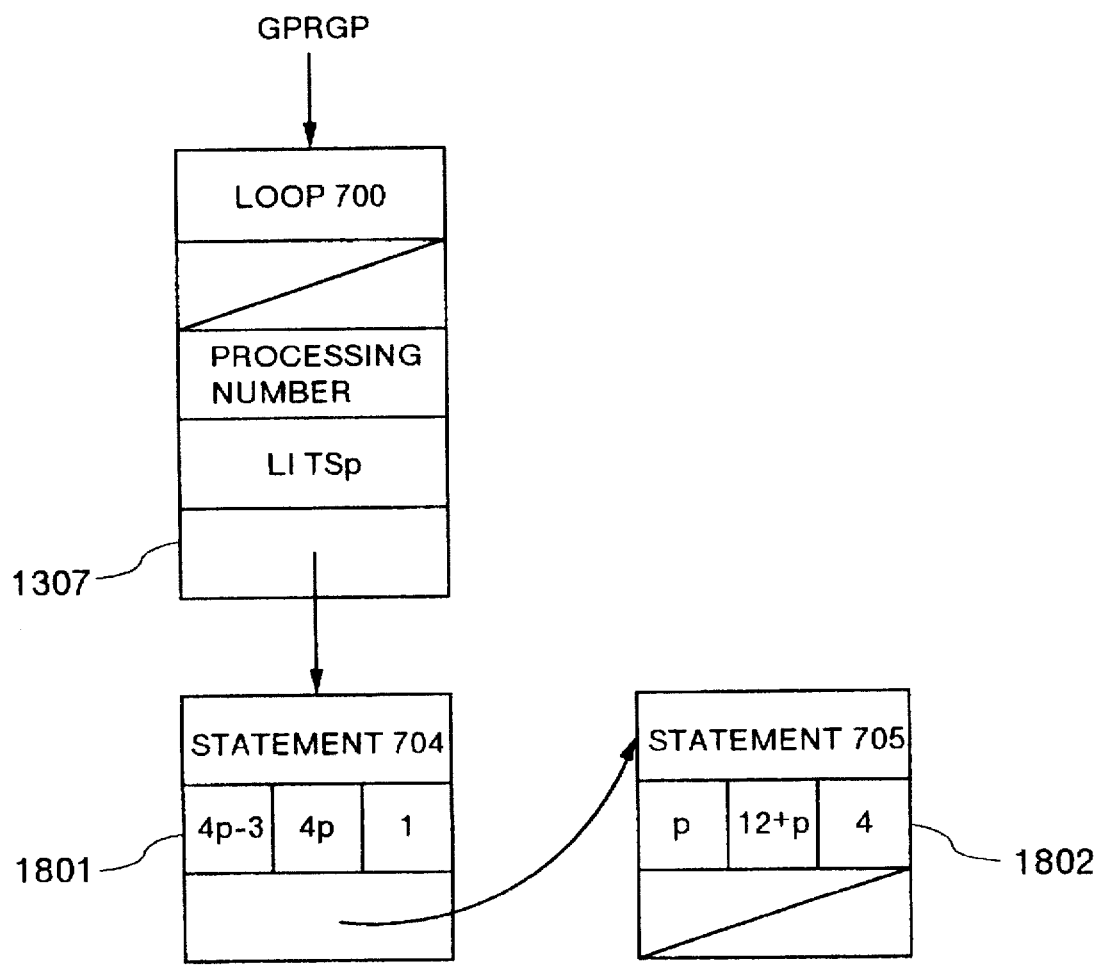
FIG. 18 is a view showing a CMP partition expression table of an example program shown in FIGS. 7A to 7C.
Figure 19A:
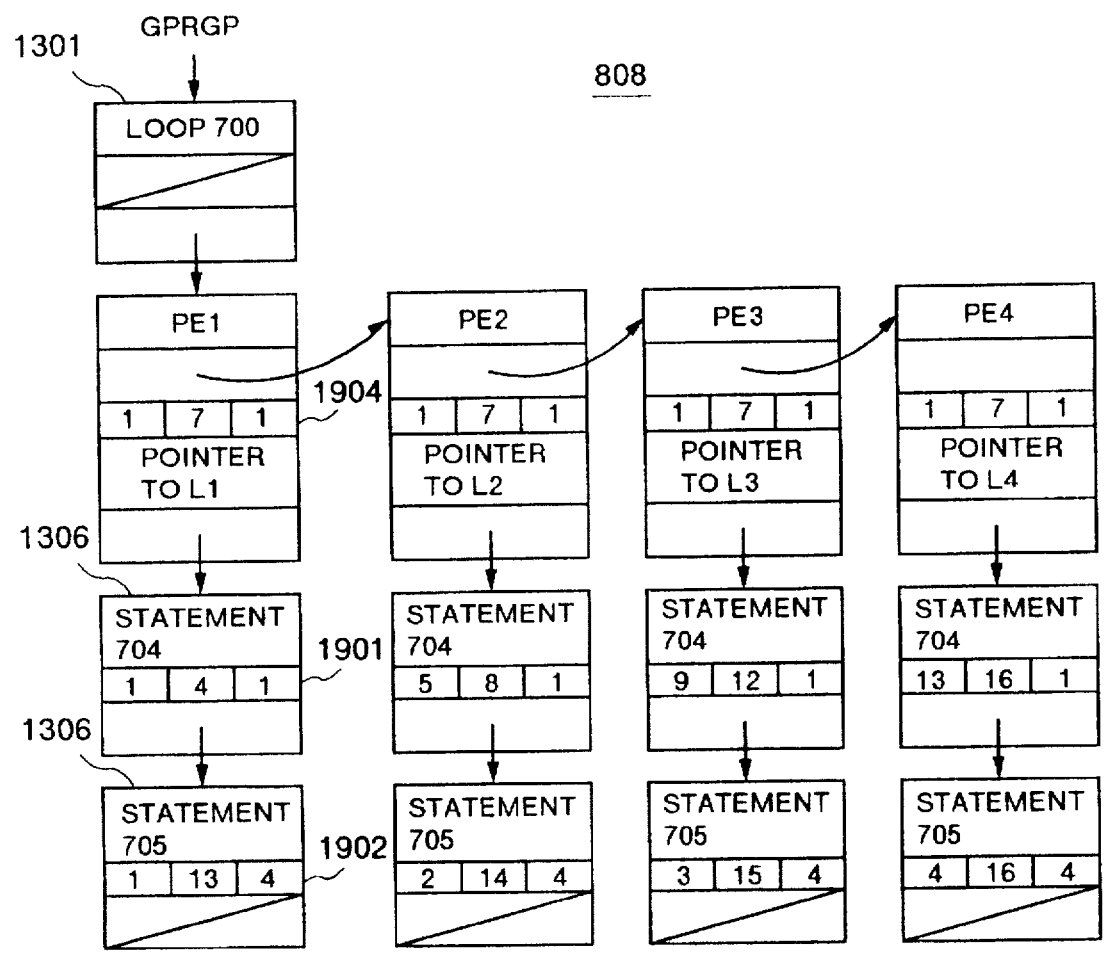
FIGS. 19A and 19B is a view showing a CMP partition value table of an example program shown in FIGS. 7A to 7C.
Figure 19B:
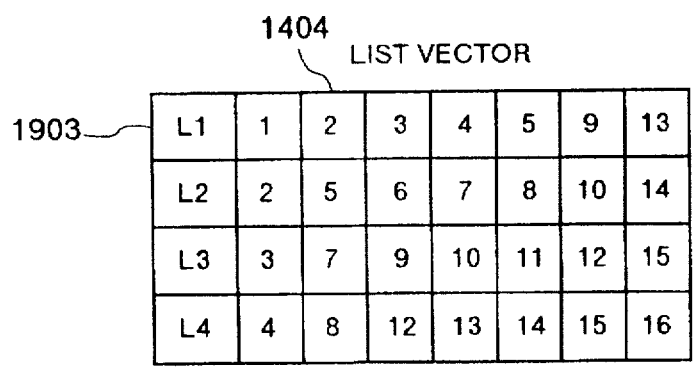

The process 108 shown in FIG. 3 is executed to write the expression for representing the GITS of each of these statements 704 and 705 in the CMP partition expression table 308. FIG. 18 shows the CMP partition expression table 308 in which the expression standing for the GITS is written.

The range expression indicated by the pointer 1307 is an expression standing for the GITS for all the processors. Concretely, the range expression 1801 is for the statement 704 and the range expression 1802 is for the statement 705. That is, if the processor number is represented by p, the range of the GITS is made to be [4p–3:4p:1] in the statement 704 or [p:12+p:4] in the statement 705.

Next, the determining process 806 shown in FIG. 8 is executed to determine whether or not each of the assignment statements has the same GITS. Herein, since these assignment statements have respective GITS', the process 109 of calculating a list vector is executed. As mentioned above, for calculating the list vector, two cases are provided, that is, a process 807 (see FIG. 10) of statically calculating a list vector and a process 807 (see FIG. 11) of dynamically calculating a list vector.

To begin with, the description will be oriented to the process 807 of statically calculating the list vector with reference to FIG. 10.

At first, the process 1001 is executed to set a process number 1303 of the computation partition expression table 308 (see FIG. 18) as a value of 1, create the CMP partition value table 808 (see FIG. 19A) from the CMP partition expression table 308 (see FIG. 18), and copy a loop number 1301 and a statement number 1306 to the table 308. In succession, the process 1002 is executed to calculate the concrete values 1901 and 1902 of the GITS for the assignment statements 704 and 705 and store the calculated values.

Next, in the process 1003, the same number of list vectors 1404 as the processor number are prepared. Herein, since four processors are prepared, the four values of the list vector Lp (p=1, 2, 3, 4) corresponding to the number of four processors are required.

Then, a process 1004 is executed to take a sum set of the GITS_A(p) and the GITS_B(p) 1902, sort it as the list vector Lp 1903 and store the list vector LP 1903. The list vector 1404 shown in FIG. 19B indicates the result done by the process 1004.

Next, the process 1005 is executed to set the local iteration set LITS 1904. In this embodiment, since the element number of each list vector is 7, the list vector is set as [1:7:1] in any processor. Then, as described in the process 1005 shown in FIG. 10, by assuming I as a loop index (loop control variable), the intermediate language is changed in a manner to allow the assignment statement to be executed only when Lp(1) is contained in the GITS of each assignment statement. Further, the process 1006 is executed to change the intermediate language in a manner to allow the array subscript of the assignment statement to be Lp(I). As a result, a new program provided after the process of statically partitioning computation is executed is that as shown in FIG. 20.

In FIG. 20, the first one 2001 of the execution statements is executed to obtain a processor number (p=1, ... , 4) of its own. The statement 2001 is generated in the process 113 of generating the node program.

In the program shown in FIG. 20, the DO loop iteration set is defined as 1, 2, ... , np. The above process 1005 is executed to define the loop iteration set as an element number np of a sum set of a GITS of each assignment statement for each processor. Further, the assignment statements 2004 and 2005 are restricted by the conditional statements 2002 and 2003 respectively so that those assignment statements may be processed in only the number of loop iteration times to be executed. This is the result of the execution of the above process 1005, which makes the assignment statement executable only when Lp(I) is contained in the GITS of each assignment statement.

Further, though the original assignment statements 704 and 705 shown in FIG. 7A each have an index I for defining or referring to the array element, the assignment statements 2004 and 2005 each have LP(I) in place of the index I. This is done by the above process 1006. This process 1006 is executed to convert the array subscripts of the assignment statements 2004 and 2005 into an array element standing for the GITS in the list vector.

As a result of the above process, the new program (see FIG. 20) provided after the sequential source program 701 shown in FIG. 7A is statically partitioned has been obtained. Then, the subsequent process is executed to take the steps of generating the inter-processor communication (process 111 of FIG. 1), generating the node program (process 113 of FIG. 1), and referring to the CMP partition value table 808 (see FIG. 19A) for the purpose of the final parallel node program 7114a (see FIG. 21).

In the parallel node program 7114a shown in FIG. 21, the data partition function of the array A is fA, the data partition function of the array B is fB, the local function of the array A is gA, and the local function of the array B is gB. Further, all the computation partitioning information of all the processors, which are statically obtained, are located in the programs through the effect of the DATA statements.

It is possible to store the content of this DATA statement as a file and read the necessary spot from the file. Further, if a shared memory is provided, the content of the DATA statement is stored in the shared memory so that each processor may read the necessary spot. With this function, each processor does not need the information required by all the processors.

Next, the description will be oriented to a process of dynamically calculating a list vector. FIG. 22 shows a computation partitioned after the sequential source program 701 shown in FIG. 7A is dynamically partitioned. The process of dynamically calculating a list vector will be discussed in detail with reference to the flowchart of FIG. 11 and the program shown in FIG. 22 provided after the partitioning process is executed.

First, the process 1101 is executed to set a process number 1303 of the CMP partition expression table 308 to a value of 2. Then, the process 1102 is executed to declare the array of the GITS for each of the assignment statements 704 and 705 in the loop 700 of the sequential program 701 shown in FIG. 7A. The declarative statement is the arrays GITSA(4) and GITSB(4) of the declarative section 2201 shown in FIG. 22. The process of generating the statement 2001 for obtaining the processor number is executed in the process 113 of generating the node program as shown in FIG. 1 like the above process of statically partitioning computation.

To obtain the GITSA for the assignment statement 704, the process 1103 is executed to generate the loop 2202 based on the GITS 1801 of the CMP partition expression table 308 (see FIG. 18). Then, the loop index I of the loop 2202 is stored in the array GITSA. This results in making it possible to generate the statement for storing the GITS for the assignment statement 704 in the array GITSA.

Likewise, to obtain the GITSB for the assignment statement 706, the loop 2203 is generated on the GITS 1802 of the CMP partition expression table 308 (see FIG. 18) so that the loop index I may be sequentially stored in the array GITSB. This makes it possible to generate the statement for storing the GITS for the assignment statement 706 in the array GITSB.

Next, the process 1105 is executed to generate the statement 2204. The statement 2204 is used for calling a subroutine which takes a sum set of the array GITSA and GITSB, give back the element number n except the overlapped ones, merge them, and store the merged result in the list vector L. Further, the process 1106 is executed to generate the statement 2205. The statement 2205 has a function of initializing the array indexes J and K to 1. Those array indexes are used for referring to the arrays GITSA and GITSB in sequence from the head. Then, the process 1107 is executed to add the statements 2202, 2203, 2204 and 2205 to the intermediate language 103 as a program for calculating a list vector.

The processes 1005 and 1006 are executed to restrict the assignment statements and change the index of the array. This holds true to the process of statically calculating a list vector.

The execution of the above process results in making it possible to obtain a program (see FIG. 22) provided after the sequential source program 701 shown in FIG. 7A is dynamically partitioned. Then, the subsequent process is executed to take the steps of generating the inter-processor communication (process 111 of FIG. 1), generating the node program (process 113 of FIG. 1), and referring to the CMP partition value table 808 (see FIG. 18) for the purpose of the final parallel node program 7114b (see FIG. 23).

If plural assignment statements are provided in the same loop, the conventional method has taken a sum set of LITS for each assignment statement as a loop iteration set. Hence, in a case that the plural assignment statements have respective methods for partitioning an array appearing in the left side of each statement (for example, the case described with reference to FIGS. 7A to 7C), all the assignment statements enable to share the LITS though they have respective GITS' for LITS'. This may result in making the result incorrect.

The aforementioned embodiment has made it possible to set a sum set of GITS' of all the assignment statements for each processor as a loop iteration set, thereby making the result incorrect.

Moreover, in a case that each assignment statement has the corresponding subscript expression of an array appearing in the left side of the statement, the conventional method may need to iterate an idle loop. That is, in a case that the LITS of each assignment statement is exclusive to each other so that the LITS is made non-connected, if the LITS is magnified to such a range (continuous) as being expressed by a geometric progression, the conventional method may execute the idle loop iteration which does not execute any assignment statement.

For example, in the sequential program 601 shown in FIG. 6A, when the data partition attribute of the array A is that shown by 602 of FIG. 6B, the parallel node program is made to be the program shown by 6114 of FIG. 6C. Herein, since the LITS of the assignment statement 604 or 605 in the loop of the original program 601 is made to be [1:4] or [13:16], the LITS is made to take [1:16] if the sum set continuously ranges. As shown in the program 6114, the LITS in the conventional method has been [1:16]. It means that the idle loop iteration (in the case of I=5 to 12) is executed.

On the other hand, if the method (process of statically partitioning computation) of this embodiment applies to the sequential program 601 shown in FIG. 6A, the program is made to be the parallel node program 6114a shown in FIG. 24. In the program 6114a, the subscript of the array of the assignment statement in the loop is composed of a GITS pre-stored in the list vector Lp. The loop goes round the range of the element length of this list vector. As such, the loop iteration times for executing the assignment statement are 8, and no idle loop iteration is executed, which makes contribution to improving the performance.

The above-mentioned embodiment operates to statically or dynamically generate the sum set of a GITS of each assignment statement as a list vector. By referring to the list vector, hence, each processor does not have any idle one in the loop iterations. This makes contribution to improving the performance.

As described above, according to the present invention, the computation partitioning method used when converting the sequential source program into a program oriented for the parallel computer makes it possible to suppress an incorrect result caused since each array appearing in the left side of the assignment statement has the corresponding partitioning method. Further, no idle iteration is caused as a result of magnifying the loop iteration set since each array appearing in the left side of the assignment statement has the corresponding subscript. This invention secures execution of essential iterations for improving the performance.

In addition, the above embodiment has been expanded with reference to the DO loop. In place, another loop may be applied.

What is claimed is:

1. A method for automatically converting a sequential source program for a single processor into a program for a distributed storage type parallel computer having plural processors by using a computer, comprising the following steps executed by said computer:

(a) analyzing a syntax of a source program described in a high-level language having at least one loop containing plural assignment statements which have different loop iteration sets expressed by indexes of an array;

(b) determining a way of partitioning said source program and array elements of said array to assign parts of said array elements respectively to said plural processors;

(c) deriving a loop iteration set of each of said plural assignment statements assigned to each of said processors, said loop iteration set being expressed by indexes of said array limited to array elements assigned to each of said processors;

(d) deriving a sum set comprised of a union of said loop iteration sets of said plural assignment statements assigned to each of said processors and generating a new array of said sum set of said loop iteration sets as array elements of said new array, wherein said new array omits ineffective loop iterations corresponding to non-assigned array elements to each of said processors; and (e) generating program codes for allowing each of said processors to execute said partitioning computation by using values of said array elements of said new array as loop iteration sets of said plural assignment statements.

2. A method for automatically converting a sequential source program for a single processor into a program for a distributed memory machines having plural processors by using a computer, comprising the steps of:

(a) analyzing, by means of said computer, a syntax of a source program described in a high-level language having at least one loop containing plural assignment statements which have different loop iteration sets expressed by indexes of an array;

(b) determining, by means of said computer, a way of partitioning said source program and array elements of said array to assign parts of said source program and parts of said array elements respectively to said plural processors;

(c) generating, by means of said computer, program codes for allowing each of said processors to derive a loop iteration set of each of said plural assignment statements assigned to each of said processors, said loop iteration set being expressed by indexes of said array limited to only array elements assigned to each of said processors for each assignment statement in at least one loop;

(d) deriving, by means of said processors, a sum set of said loop iteration sets upon execution of said partitioning computation and generating program codes for generating a new array of said sum set consisting of said loop iteration sets of said assigned array elements as new array elements of said new array; and (e) generating, by means of each of said processors, program codes allowing each of said processors to execute said partitioning computation by using values of the new array elements of said new array as loop iteration sets of said plural assignment statements assigned to each of said processors.

3. A computation partitioning method for obtaining a loop iteration set to be shared by plural processors of a distributed memory type parallel computer, for a loop of sequential source program in a language converting system for generating a parallelizing source program or an object oriented for the plural processors with a sequential source program, comprising the steps of:

(a) inputting information for indicating how data declared in said sequential source program is decomposed to each processor for deriving a loop iteration set for said each processor comprising loop indexes for the data decomposed to said each processor;

(b) holding as a list vector a sum set of said loop indexes given when said data of each assignment statement in a loop is allocated to said each processor wherein when said sum set omits ineffective assignment statements corresponding to data elements absent from said each processor; and (c) setting a number of loop execution times in said each processor as an element number of the list vector of said each processor wherein a loop index appearing in an assignment statement in the loop is replaced with a value determined from said list vector.

4. The computation partitioning method as claimed in claim 3, wherein said list vector is determined when said language is converted.

5. The computation partitioning method as claimed in claim 3, wherein a process of calculating said list vector in the execution is included in a program for parallelizing said parallelized source program.

6. A computation partitioning method for obtaining a loop iteration set to be shared by each of plural processors in a parallel computer for a loop in a sequential source program in a system for converting an input sequential source program into a parallelizing source program or an object program oriented for a distributed memory machine, comprising the steps of:

(a) inputting data indicating how an array of said sequential source program is distributed to each processor;

(b) obtaining a global iteration set corresponding to a set of loop indexes for indicating a loop iteration set to be shared by each processor from an original loop iteration set for each of said assignment statements in a loop, based on said data for indicating distribution of the data;

(c) obtaining a sum set of said global iteration sets limited to all assignment statements in the loop, for each processor, storing elements of said sum set, and holding the elements as a list vector; and (d) setting a number of loop iteration times of each processor to an element number of said list vector and replacing a loop index of a subscript expression of an array of said assignment statement in the loop with the element number from said list vector, whereby only effective loop iterations will be processed.

7. A computation partitioning method for obtaining a loop iteration set to be shared by processors of a parallel computer for a loop in a sequential source program in a system for converting an input sequential source program into a parallelizing source program or an object program oriented for a distributed memory machines, comprising the steps of:

(a) inputting data directive of how an array of said sequential source program is decomposed to each processor;

(b) obtaining a lower limit expression, an upper limit expression, and an increment expression indicating a loop iteration set to be shared by each processor among original loop iteration sets for each assignment statement in a loop, based on the data directive;

(c) generating a statement for deriving a set of loop index values indicating an effective loop iteration set for each assignment statement by using said lower limit expression, said upper limit expression, and said increment expression;

(d) deriving a sum set of said loop index values corresponding to all the assignment statements in a loop, sorting the elements of said sum set to obtain a result, and setting the sorted result as a list vector, for each processor, wherein ineffective loop iterations are omitted; and (e) setting a number of loop iteration times of each processor to an element number of said list vector, and replacing a loop index in a subscript expression of an array of the assignment statement in the loop with the element number said list vector.

8. The computation partitioning method as claimed in claim 6, wherein any loop index is changed in a manner to execute said assignment statement only when an element number located at said loop index number of said list vector is contained in the global iteration set of the assignment statement in said loop.

9. The computation partitioning method as claimed in claim 7, wherein any loop index is changed in a manner to execute said assignment statement only when an element number located at said loop index number of said list vector is contained in the global iteration set of said assignment statement in said loop.

* * * * *